US012749343B2

(12) United States Patent
Venkatesha Rao et al.

(10) Patent No.: US 12,749,343 B2
(45) Date of Patent: Sep. 29, 2026

(54) DIGITIZATION OF HUMAN MOTION DATA FOR SEMANTIC SEARCH

(71) Applicant: SONY GROUP CORPORATION, Tokyo (JP)

(72) Inventors: Krishna Prasad Agara Venkatesha Rao, Bengaluru (IN); Akshay Shekhar Kadakol, Bengaluru (IN); Srinidhi Srinivasa, Bengaluru (IN)

(73) Assignee: SONY GROUP CORPORATION, Tokyo (JP)

( * ) Notice: Subject to any disclaimer, the term of this patent is extended or adjusted under 35 U.S.C. 154(b) by 210 days.

(21) Appl. No.: 18/806,393

(22) Filed: Aug. 15, 2024

(65) Prior Publication Data

US 2025/0078572 A1 Mar. 6, 2025

Related U.S. Application Data

(60) Provisional application No. 63/579,057, filed on Aug. 28, 2023.

(51) Int. Cl.
*G06V 40/16* (2022.01)
*G06F 16/532* (2019.01)
(Continued)

(52) U.S. Cl.
CPC ............ *G06V 40/23* (2022.01); *G06F 16/532* (2019.01); *G06V 10/82* (2022.01); *G06V 40/171* (2022.01); *G06V 40/174* (2022.01); *G06V 40/28* (2022.01)

(58) Field of Classification Search
CPC .... G06V 40/23; G06V 40/171; G06V 40/174; G06V 40/28; G06V 10/82; G06V 10/25;
(Continued)

(56) References Cited

FOREIGN PATENT DOCUMENTS

| | | | |
|---|---|---|---|
| CN | 111950412 | A | 11/2020 |
| CN | 113158914 | A | 7/2021 |

(Continued)

OTHER PUBLICATIONS

Sun et al., A deep learning-based approach for emotional analysis of sports dance, 2023, Peer J. Comp Sci. pp 1-14. (Year: 2023).*

(Continued)

*Primary Examiner* — Kathleen M Broughton
(74) *Attorney, Agent, or Firm* — CHIP LAW GROUP

(57) ABSTRACT

An electronic device and a method for digitization of human motion data for semantic search is provided. The electronic device receives a sequence of input images depicting a physical performance associated with a body movement discipline and extracts a localized instance of a performer associated with the physical performance from an image frame of the sequence of image frames. The electronic device determines a plurality of performance attributes associated with the performer based on application of an attribute recognition network on the localized instance. The plurality of performance attributes comprises an emotion attribute, a posture attribute, and a hand gesture attribute. The electronic device searches a performance database based on the plurality of performance attributes to generate a search result. The search result specifies whether the localized instance represents an unregistered pose or a registered pose of the body movement discipline.

20 Claims, 10 Drawing Sheets

(51) Int. Cl.
*G06V 10/82* (2022.01)
*G06V 40/20* (2022.01)

(58) Field of Classification Search
CPC .... G06V 10/26; G06V 10/761; G06V 10/764; G06V 20/46; G06F 16/532
See application file for complete search history.

(56) References Cited

FOREIGN PATENT DOCUMENTS

| | | |
|---|---|---|
| CN | 115497149 A | 12/2022 |
| CN | 117316129 A | 12/2023 |

OTHER PUBLICATIONS

Bera et al., Fine-Grained Sports, Yoga, and Dance Postures Recognition: A Benchmark Analysis, 2023, arXiv: 2308.00323v1, pp. 1-12. (Year: 2023).*

Bhavanam et al., On the Classification of Kathakali Hand Gestures Using Support Vector Machines and Convolutional Neural Networks, 2020, Int. Conference on AI and Signal Processing, pp. 1-7. (Year: 2020).*

Wei, et al., "Learning facial expression and body gesture visual information for video emotion recognition", Expert Systems with Applications, vol. 237, Part A, Mar. 1, 2024.

Lee Kyoungoh et al: "Self-Updatable Database System Based on Human Motion Assessment Framework", IEEE Transactions On Circuits and Systems for Video Technology, May 27, 2022 (May 27, 2022), pp. 7160-7176, vol. 32, No. 10, XP011921896, ISSN: 1051-8215, DOI: 10.1109/TCSVT.2022.3178430.

* cited by examiner

DIGITIZATION OF HUMAN MOTION DATA FOR SEMANTIC SEARCH

CROSS-REFERENCE TO RELATED APPLICATIONS/INCORPORATION BY REFERENCE

This Application also makes reference to U.S. Provisional Application Ser. No. 63/579,057, which was filed on Aug. 28, 2023. The above stated Patent Applications are hereby incorporated herein by reference in their entirety.

FIELD

Various embodiments of the disclosure relate to motion data. More specifically, various embodiments of the disclosure relate to an electronic device and a method for digitization of human motion data for semantic search.

BACKGROUND

Advancements in motion-capturing technology have led to the development of electronic devices that can capture human movements and images in digital formats. These devices often include features such as pose estimation, tracking models, and image or video processing. They enable the manipulation of various aspects of the image or video to extract posture and depth from the collected data. Currently, pose estimation, tracking models, and image or video processing are used to analyze and extract meaningful information, such as pose and expression, from digitized image or video data. However, it is important to note that these techniques typically only manage 17-32 major joints of the human body. For instance, some of the known devices may wirelessly capture motion using various sensor systems and cameras, respectively. However, when it comes to body movement disciplines, such as classical dance forms, yoga, or martial arts, which often involve intricate and subtle movements of the eyes, fingers, and facial expressions, existing electronic devices may fall short. These devices are limited in their ability to capture the intricate and sophisticated body postures, movements, and expressions associated with Indian classical dance forms, yoga, or martial arts.

Limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and method for digitization of human motion data for semantic search is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
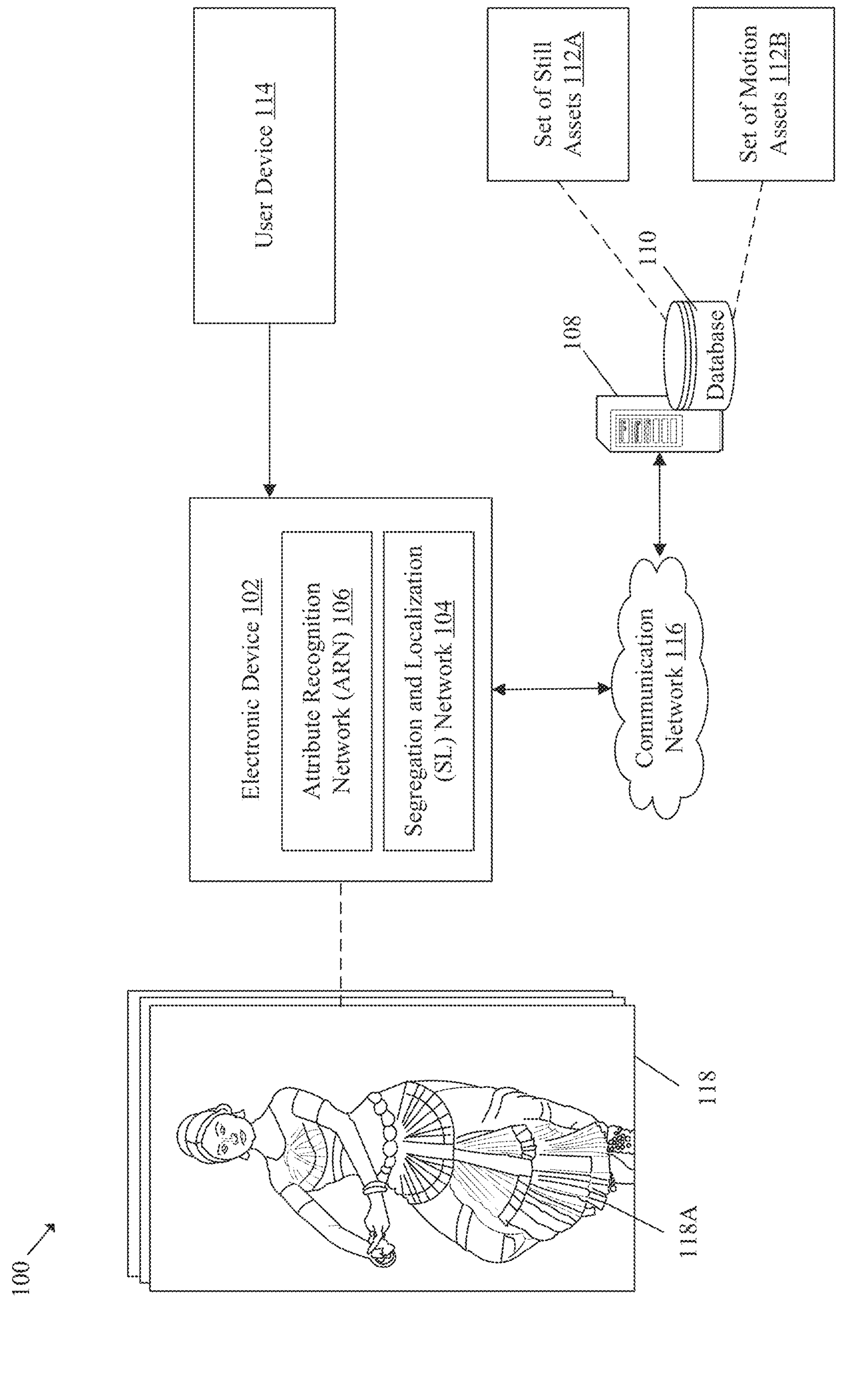
FIG. 1 is a block diagram that illustrates an exemplary network environment for digitization of human motion data for semantic search, in accordance with an embodiment of the disclosure.

The following described implementation may be found in an electronic device and method for digitization of human motion data for semantic search. Exemplary aspects of the disclosure may provide an electronic device receives a sequence of input images (for example, a sequence of input images 118 of FIG. 1) depicting a physical performance associated with a body movement discipline. Next, the electronic device extracts a localized instance of a performer associated with the physical performance from an image frame of the sequence of image frames. The electronic device then determines a plurality of performance attributes associated with the performer based on application of an attribute recognition network on the localized instance. Further, the plurality of performance attributes that comprises an emotion attribute that includes positional information associated with a set of facial features of the performer, a posture attribute associated with a body of the performer, and a hand gesture attribute associated with each hand of the performer. Furthermore, the electronic device searches a performance database based on the plurality of performance attributes to generate a first search result, wherein the first search result specifies that the localized instance represents an unregistered pose or a registered pose of the body movement discipline.

Body movement disciplines, such as classical dance forms, martial arts and yoga often include intricate, sophisticated, and subtle movements of eyes, fingers, and facial expressions. Such delicate assemblies of expressions may not be fully captured by existing electronic devices due to their limited ability to manage only major body joints. Consequently, these devices may not adequately capture the intricate and sophisticated body postures, movements, and expressions associated with body movement disciplines, such as classical dance form, martial arts and yoga, such as Indian classical dance. The limitations of current systems make it challenging to automate the tasks of a dance trainer, as the granularity of the body movement discipline may not be sufficiently captured. For example, while the positioning and movement of the body recorded by pose estimation, tracking models, or image processing may be crucial for automating a training program for body movement disciplines, such as classical dance form, existing records may not capture the exact intricacies required. As a result, training programs based on current pose estimation, tracking models, or image processing may not be sufficiently comprehensive to train participants according to the intricate postures and movements of the body movement discipline. Failure to train participants according to these intricacies may result in suboptimal training outcomes.

The electronic device of the present disclosure may provide an automatic, efficient, and robust digitization of human motion data for semantic search. To achieve this, the electronic device may receive a sequence of image frames associated with a performer of a body movement discipline. In some embodiments, the electronic device may extract localized instances to apply an attribute recognition network for determining a plurality of performance attributes, such as an emotion attribute, a posture attribute, and a hand gesture attribute. The hand gesture attribute may represent a root mudra from a plurality of root mudras associated with the body movement discipline. The emotion attribute may be represented by various permutations and combinations of a set of facial features. The posture attribute may be represented by key point detection, where the detected key points may correspond to all the body joints of the performer. The electronic device may generate metadata based on the plurality of performance attributes. The electronic device may then search the generated metadata in a performance database to identify whether the localized instance represents an unregistered pose or a registered pose of the body movement discipline, such as dance form. This identification may be based on the computation of a vector similarity score between a vector search query (generated based on the metadata) and assets in the performance database.

Thus, the electronic device may be configured to capture physical assets such as intricate and sophisticated body postures, movements, and expressions. It may convert these captured physical assets into digitized assets and tag them to provide search capabilities for users or participants. For example, the electronic device may be configured to detect and identify specific body parts, configurations of such parts, and then aggregate the identified parts and configurations for comprehensive analysis and representation of the physical performance.

In some implementations, the electronic device may employ a multi-component architecture including a Performer Segregation and Localization Network, a Multi-Head Spatio-Physical Attribute Recognition Network, and a Temporal Tracking and Consolidation Network. This architecture may enable the capture of various nuances required for digitization of body movement disciplines, such as traditional dance forms, including but not limited to coordinated movement of limbs, tracking of the dancer's gaze, eyebrow movement, lip movement, and emotion.

The disclosed system may provide advantages in preserving and promoting traditional cultural assets. For example, the system may enable the digitization of existing content, including monocular videos, with a high level of detail. The system may also facilitate the creation of searchable sub-assets, allowing students to study specific aspects of an Indigenous art form without direct guidance from an expert.

FIG. 1 is a block diagram that illustrates an exemplary network environment for digitization of human motion data for semantic search, in accordance with an embodiment of the disclosure. With reference to FIG. 1, there is shown a network environment 100. The network environment 100 may include an electronic device 102, a server 108, a database 110, a user device 114 and a communication network 116. The electronic device 102, the database 110, and the user device 114 may be configured to communicate with each other via one or more communication networks (such as the communication network 116. Further, the electronic device 102 may be configured to store a Segregation and Localization (SL) network 104 and an attribute recognition network (ARN) 106, for instance. The electronic device 102 may receive a sequence of input images 118 for motion asset creation. In FIG. 1, there is further shown a set of still assets 112A and a set of motion assets 112B that may be stored in the database 110.

The electronic device 102 may include suitable logic, circuitry, interfaces, and/or code that may be configured to receive a sequence of input images 118 depicting a physical performance associated with a body movement discipline (for example, an Indian Dance form such as Kathak, Yoga, or martial arts). The electronic device 102 may extract a localized instance (for example, a localized instance at 308 in FIG. 3) of a performer 118A associated with the physical performance from an image frame (for example, an image frame at 302 in FIG. 3) of the sequence of image frames. The electronic device 102 may determine a plurality of performance attributes associated with the performer 118A based on application of the ARN 106 on the localized instance. Herein, the plurality of performance attributes that comprises an emotion attribute (for example, an emotion attribute 410 of FIG. 4) that includes positional information associated with a set of facial features of the performer 118A, a posture attribute (for example, a posture attribute 416 of FIG. 4) associated with a body of the performer 118A, and a hand gesture attribute (for example, a hand gesture attribute 422 of FIG. 4) associated with each hand of the performer 118A. The electronic device 102 may search a performance database (for example, the database 110 or a performance database 804A-804N) based on the plurality of performance attributes to generate a first search result (for example, a first search result 814A-814N shown in FIG. 8). The first search result may specify that the localized instance represents an unregistered pose or a registered pose of the body movement discipline. Examples of the electronic device 102 may include, but are not limited to, a computing device, a smartphone, a cellular phone, a mobile phone, a gaming device, a mainframe machine, a server, a computer workstation, a machine learning device (enabled with or hosting, for example, a computing resource, a memory resource, and a networking resource), a wearable device with performance attribute detection sensor, a depth sensor device, and/or a consumer electronic (CE) device.

In an embodiment, the registered or unregistered pose may be referred to as a mudra of the body movement discipline. As used herein, the term "mudra" in the body movement discipline may refer to a symbolic position of the hand used to express meaning, emotion, and rhythmic experience in performance. The mudra may be essentially a cluster of symbolic movements having an explicit physical form, a name, and a visible shape. The meaning of the mudra may be created through the movements of the hands, rather than by traceable linguistic presence. The physical form of the mudra may be carved by the agency of hand movements. In performance, mudra, being the movement energy of the hand, interprets meanings and experiences a range of emotions produced in the body. In Indian body movement disciplines, the mudra is a key dance step comprising a root mudra associated with the hand gesture, a posture associated with the body, and an emotion expressed via a face of the performer.

In an embodiment, the registered pose of the body movement discipline may be referred to as a still asset of the set of still assets 112A or a motion asset of the set of motion assets 112B. Further, the register pose may be stored in the performance database or the database 110, for example. The unregistered pose of the body movement discipline may be an asset that is not present in the performance database.

For example, the electronic device 102 may be capable of digitizing and tagging assets (such asset of still assets 112A or set of motion assets 112B) that result in searchable digital assets through which the user may master the body movement disciplines, such as dance form without guidance from the trainer. For example, the electronic device 102 may capture granularity of one or more still assets 112A, such as granularity associated with fingers, eye gaze, eyebrow movement, lip movement and emotion. For example, the granularity associated with the fingers may be related to a relative position of each joint of the fingers.

The SL network 104 may be configured to receive the image frame from the sequence of input images 118 and generate localization information associated with the performer 118A present in the image frame of the sequence of input images 118. The localization information may be further used to extract a localized instance of the performer 118A. In accordance with an embodiment, the SL network 104 may segregate the received image frame into a plurality of parts for identification and analyze each segregated part from the plurality of parts. The SL network 104 may provide pixel-by-pixel details of each part based on application of a clustering algorithm (such as K-means clustering). The SL network 104 may separate the image frame into a plurality of regions. Each region of the plurality of regions may be separated from each other using a plurality of borders associated with each region of the plurality of regions. (for example, as shown at 306 of FIG. 3). The border of each region may be associated with further processing of the regions for image classification or object detection. For example, the SL network 104 may perform instance segmentation or may perform semantic segmentation to generate a label for each pixel of a plurality of pixels of the image frame. Further, the tagging of the pixels may help to determine a group of pixels associated with a type of object (for example, a dance performer).

In an embodiment, the SL network 104 may identify the location of each region of the plurality of regions of the segmented image frame. The location of each region may be identified by drawing borders around each region. The SL network 104 may apply localization algorithm to predict a set of four numbers to draw the border around the plurality of regions. Such numbers may define the coordinates (e.g., bounding box coordinates) of a localized region defining the height and width of the localized region.

For example, a video (such as, a sequence of input images 118) may be received by the electronic device 102 to identify the coordinates of each object of the image frame. The electronic device 102 may apply the SL network 104 on each image frame of the received video. The SL network 104 may further segregate each object of the image frame based on the application of the clustering algorithm. Furthermore, the SL network 104 may identify the coordinates of each object of the image frame based on the application of localization algorithm.

In an embodiment, the SL network 104 may be a neural network. The neural network may be a computational network or a system of artificial neurons, arranged in a plurality of layers, as nodes. The plurality of layers of the neural network may include an input layer, one or more hidden layers, and an output layer. Each layer of the plurality of layers may include one or more nodes (or artificial neurons, represented by circles, for example). Outputs of all nodes in the input layer may be coupled to at least one node of hidden layer(s). Similarly, inputs of each hidden layer may be coupled to outputs of at least one node in other layers of the neural network. Outputs of each hidden layer may be coupled to inputs of at least one node in other layers of the neural network. Node(s) in the final layer may receive inputs from at least one hidden layer to output a result. The number of layers and the number of nodes in each layer may be determined from hyper-parameters of the neural network. Such hyper-parameters may be set before, while training, or after training the neural network on a training dataset.

Each node of the neural network may correspond to a mathematical function (e.g., a sigmoid function or a rectified linear unit) with a set of parameters, tunable during training of the network. The set of parameters may include, for example, a weight parameter, a regularization parameter, and the like. Each node may use the mathematical function to compute an output based on one or more inputs from nodes in other layer(s) (e.g., previous layer(s)) of the neural network. All or some of the nodes of the neural network may correspond to the same or a different mathematical function.

In training of the neural network, one or more parameters of each node of the neural network may be updated based on whether an output of the final layer for a given input (from the training dataset) matches a correct result based on a loss function for the neural network. The above process may be repeated for the same or a different input until a minima of loss function may be achieved, and a training error may be minimized. Several methods for training are known in art, for example, gradient descent, stochastic gradient descent, batch gradient descent, gradient boost, meta-heuristics, and the like.

The ARN 106 may be configured to be applied on the localized instance of the performer 118A to determine a plurality of performance attributes associated with the performer 118A. The ARN 106 may be a computational network or a system of artificial neurons to recognize specific attributes or features of the performer 118A in the sequence of input images 118 and to learn the recognized attributes. For example, the ARN 106 may be a convolutional neural network (CNN), a vision transformer, or a variant thereof, to extract plurality of performance attributes of the performer 118A. For example, the plurality of performance attributes that are extracted may include an emotional attribute, a posture attribute, a hand gesture attribute, a foot attribute, and the like. The ARN 106 extracts features from each of the plurality of performance attributes, further the extracted features are treated as multi-label classification tasks. Herein, the multi-label classification helps the ARN 106 to map inputs to binary vectors. For example, the inputs may include videos, images, higher layer size grids, and the like. Alternatively, in some embodiments, the artificial neurons in the ARN 106 may be implemented using a combination of hardware and software.

In an embodiment, the ARN 106 may receive the localized instance of the performer 118A from the SL network 104. The localized instance of the performer 118A may be determined by the application of SL network 104 on the received image frame from the sequence of input images 118. The details of application of the SL network 104 on the image frames are described above in the description of the SL network 104.

In an embodiment, the ARN 106 is a multi-head neural network that includes a plurality of attribute networks such as emotional recognition network, a posture recognition network, and a hand gesture recognition network to categorize and learn the plurality of performance attributes. The ARN 106 may be trained using a supervised, semi supervised, or unsupervised learning technique. During training, each of the plurality of performance attribute networks may learn to categorize parts of the localized instance to determine plurality of performance attributes such as facial attributes, posture attributes, and hand gesture attributes. Thereafter, each of the determined performance attributes may be combined into a weighted sum of features based on weights associated with the determined performance attributes. Further, the weighted sum of features (such as facial features, body postures and hand gestures) may be used to train the ARN 106 for each performance attributes.

The server 108 may include suitable logic, circuitry, and interfaces, and/or code that may be configured to receive the sequence of input images 118 depicting a physical performance associated with a body movement discipline. The server 108 may receive from the electronic device 102, the localized instance of the performer 118A. The server 108 may receive the plurality of performance attributes. The server 108 may receive a search query from the electronic device 102. The server 108 may search a performance database (for example, the database 110) based on the search query received from the electronic device 102. Further, the server 108 may fetch the first search result and provide the first search result to the electronic device 102.

The server 108 may be implemented as a cloud server and may execute operations through web applications, cloud applications, HTTP requests, repository operations, file transfer, and the like. Other example implementations of the server 108 may include, but are not limited to, a database server, a file server, a web server, a media server, an application server, a mainframe server, a machine learning server (enabled with or hosting, for example, a computing resource, a memory resource, and a networking resource), or a cloud computing server.

In at least one embodiment, the server 108 may be implemented as a plurality of distributed cloud-based resources by use of several technologies that are well known to those ordinarily skilled in the art. A person with ordinary skill in the art will understand that the scope of the disclosure may not be limited to the implementation of the server 108 and the electronic device 102, as two separate entities. In certain embodiments, the functionalities of the server 108 can be incorporated in its entirety or at least partially in the electronic device 102 without a departure from the scope of the disclosure. In certain embodiments, the server 108 may host the database 110. Alternatively, the server 108 may be separate from the database 110 and may be communicatively coupled to the database 110.

The database 110 may include suitable logic, interfaces, and/or code that may be configured to store the set of still assets 112A and the set of motion assets 112B. The database 110 may be derived from data off a relational or non-relational database, or a set of comma-separated values (csv) files in conventional or big-data storage. The database 110 may be stored or cached on a device, such as a server (e.g., the server 108) or the electronic device 102. The device storing the database 110 may be configured to receive a query for the set of the still assets 112A and the set of motion assets 112B from the electronic device 102 or the server 108. For example, the query may include request for the still asset from the set of the still assets 112A and the motion asset from the set of motion assets 112B. In another embodiment, the query may include a natural language query or an image-based query from the user device 114. The database 110 may receive a user input (for example, a user input at 902 in FIG. 9) from the user device 114. In response, the device of the database 110 may be configured to generate a vector search query and compute a similarity score between the vector search query and each asset of the plurality of assets. Further, the device of the database 110 may be configured to provide a search result that may be generated based on the computed similarity score to the electronic device 102 or the server 108 or the user device 114. In an embodiment, the search result may include a top-k assets based on sequence of the computed similarity score of each asset of the plurality of assets stored in the database 110.

In some embodiments, the database 110 may be hosted on a plurality of servers stored at the same or various locations. The operations of the database 110 may be executed using hardware including a processor, a microprocessor (e.g., to perform or control performance of one or more operations), a field-programmable gate array (FPGA), or an application-specific integrated circuit (ASIC). In some other instances, the database 110 may be implemented using software. In an exemplary embodiment, the database 110 may be a vector database.

The set of still assets 112A may include metadata of a plurality of body movement disciplines. The metadata may include tags, emotion attributes, posture attributes, hand gesture attributes, and other information associated with the body movement discipline's image frame. For example, the metadata of the image frame may be represent a tag of Krishn posture in kathak, the emotion attribute of the Krishn posture be calm and smiling (that may be encoded in characters as shown at 506A in the FIG. 5), the posture attribute of Krishn posture may be slight tilt of body with hands gesture near to the face representing flute (similar to the posture attribute at 606A in the FIG. 6), and hands gesture attribute of Krishn posture may be Tripataka of both the hands (similar to the hand gesture attribute at 706A in FIG. 7). Furthermore, the metadata may also include the relation between the emotion attribute, posture attribute, and hand gesture attributes.

The set of motion assets 112B may include metadata of a plurality of body movement disciplines. The metadata may include tags, emotion attributes, posture attributes, hand gesture attributes, time duration, and other information associated with the body movement discipline's multiple image frames. For example, the metadata of a motion asset may include a set of still assets 112A that may represent transition between the Krishn posture in kathak to Radha posture in kathak.

The user device 114 may include suitable logic, circuitry, and interfaces that may be configured to provide the user input associated with the body movement discipline to the electronic device 102. The user input may include at least one of a natural language query or an image-based query. Further, the electronic device 102 may be configured to generate a vector search query based on application of a contrastively trained neural network on the user input and compute a similarity score between the second vector search query and each asset of the plurality of assets (such as the set of still assets 112A and the set of motion assets 112B). The electronic device 102 may further be configured to generate the search result that includes the top-k assets of the plurality of assets for which the computed similarity score is above a threshold score. Furthermore, the user device 114 may be configured to receive a response to at least one of the natural language queries or the image-based query from the electronic device 102. The user device 114 may be controlled by the electronic device 102 to display the response. The response may include, for example, a source image frame that depicts the registered pose in at least one of the top-k assets. Examples of the user device 114 may include, but are not limited to, a computing device, a smartphone, a cellular phone, a mobile phone, a gaming device, a mainframe machine, a server, a computer workstation, a machine learning device (enabled with or hosting, for example, a computing resource, a memory resource, and a networking resource), a wearable device with performance attribute detection sensor, a depth sensor device, and/or a consumer electronic (CE) device.

For example, the user device 114 may be configured to receive the user input from the user and provide it to the circuitry of electronic device 102. The user input may include the natural language query, such as a query for a Raudra Nataraja mudra (as shown in 902 of the FIG. 9) associated with an Indian classical body movement discipline Bharatnatyam. The circuitry of electronic device 102 may be configured to perform a vector search for the Raudra Natraja mudra on the database 110 to compute the similarity score (as shown in 904 of FIG. 9). Further, based on the similarity score between the search query of Raudra Natraja mudra and each of the assets of set of still assets 112A or set of motion assets 112B in the database 110, the electronic device 102 may be configured to generate the search result and display the search result on the user device 114 (as shown at 906 of the FIG. 9).

The communication network 116 may include a communication medium through which the electronic device 102 and the server 108 may communicate with one another. The communication network 116 may be one of a wired connection or a wireless connection. Examples of the communication network 116 may include, but are not limited to, the Internet, a cloud network, Cellular or Wireless Mobile Network (such as Long-Term Evolution and $5^{th}$ Generation (5G) New Radio (NR)), satellite communication system (using, for example, low earth orbit satellites), a Wireless Fidelity (Wi-Fi) network, a Personal Area Network (PAN), a Local Area Network (LAN), or a Metropolitan Area Network (MAN). Various devices in the network environment 100 may be configured to connect to the communication network 116 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 1002.11, light fidelity (Li-Fi), 1002.16, IEEE 1002.11s, IEEE 1002.11g, multi-hop communication, wireless access point (AP), device to device communication, cellular communication protocols, and Bluetooth (BT) communication protocols.

In operation, the electronic device 102 may receive the sequence of input images 118 that depicts a physical performance associated with a body movement discipline. The body movement discipline may be an Indian classical dance form, yoga, and martial arts or a different dance form such as Hip-Hop, Samba, Belly dance, ballet, Step dance, and Belly dance. The SL network 104 may be applied on the sequence of input images 118 to generate localization information associated with the performer 118A. As an example, the electronic device 102 may receive a Kuchipudi dance video comprising a plurality of image frames. The electronic device 102 may apply the SL network 104 on at least one of the image frames to segregate the plurality of performers present in the image frame. Further, the SL network 104 may identify location and coordinates of each of the performer present in the image frame and may predict a border or a bounding box around each of the performers to generate the localization information associated with the each of the performer. Details related to the performer 118A are further described, for example, in FIG. 3.

The electronic device 102 may extract the localized instance of the performer 118A associated with the physical performance from an image frame of the sequence of input images 118. The localized instance of the performer 118A may be extracted based on the localized information. Herein, the localized instance of a performer (such as the performer 118A) may refer to specific identification and spatial information of a dance performer within a given frame of the sequence of input images 118. Such information may include a precise location, boundaries, and segmentation of the performer's image, distinguishing them from the background and other performers. The localized instance of each performer may be associated with tags. For example, the tags may be associated with a head, hands, foot, body, legs, eyes, nose, and the like. In an embodiment, the localized instance of each of the plurality of performers may also be stored on the database 110. The localized instance may be retrieved by the electronic device 102 or server 108 based on the combination of the metadata and the tags associated with each of the localized instance. For example, the localized instance of the performer 118A may be identified to determine the emotion of the performer 118A based on the configuration of the head. Details related to the localized instance are further described, for example, in FIG. 3.

The electronic device 102 may determine the plurality of performance attributes associated with the performer 118A based on application of an attribute recognition network on the localized instance. The plurality of performance attributes may include the emotion attributes, the posture attributes, the hand gesture attributes, and the like. Herein, the emotion attribute may include positional information associated with a set of facial features of the performer 118A, the posture attribute associated with a body of the performer 118A, and the hand gesture attribute associated with each hand of the performer 118A. Details related to the plurality of performance attributes are further described, for example, in FIG. 4.

The electronic device 102 may search the performance database based on the plurality of performance attributes to generate a first search result. The search result specifies whether the localized instance represents the unregistered pose or the registered pose of the body movement discipline. The search on the performance database (for example, the performance database 804A-804N) may be a vector search, which is based on a vector-based distance metric (such as a vector dot product) between the search query and the stored dance information on the performance database (for example, the database 110). In an embodiment, the performance database 804A-804N may be a still asset database that may store the set of still assets 112A. In another embodiment, the performance database may be a motion asset database that may store the set of motion assets 112B. Details related to the first search result are further described, for example, in FIG. 9.

The electronic device 102 provides an automatic, efficient, and robust digitization process of human motion data for semantic search capabilities. Through this process, the electronic device 102 may capture the physical assets of a performance, which include the intricate and sophisticated body postures, movements, and expressions that are integral to the body movement discipline. Such captured physical assets may be then transformed into digitized assets. Moreover, the electronic device 102 may be equipped to tag such digitized assets, thereby enhancing their searchability and accessibility to users or participants who may wish to study or reference specific aspects of the body movement discipline. This tagging feature may be particularly beneficial for educational and preservation purposes, as it allows for the detailed study and analysis of the nuanced elements that define traditional body movement disciplines.

Figure 2:
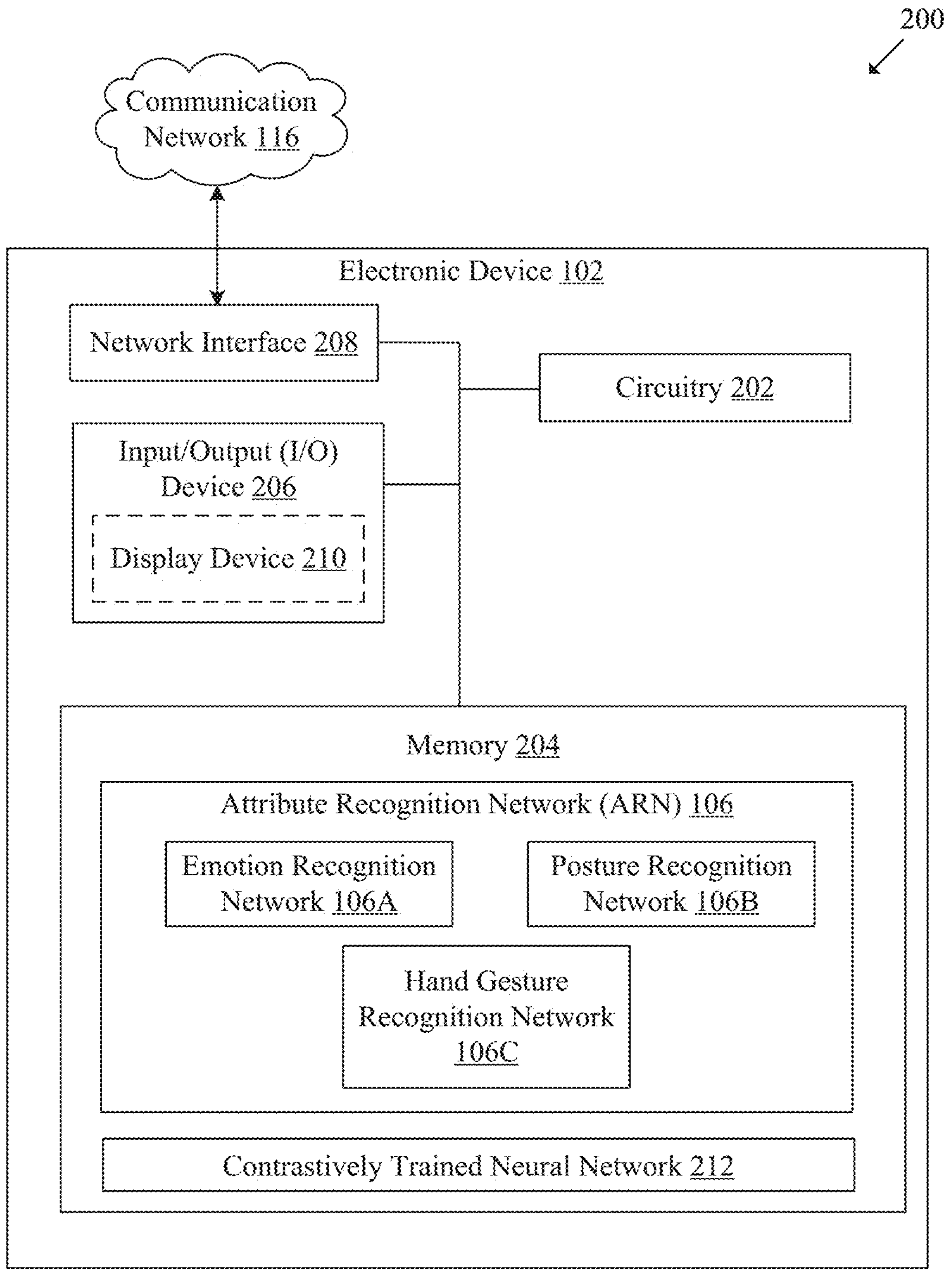
FIG. 2 is a block diagram that illustrates an exemplary electronic device of FIG. 1, in accordance with an embodiment of the disclosure.

FIG. 2 is a block diagram that illustrates an exemplary electronic device of FIG. 1, in accordance with an embodiment of the disclosure. FIG. 2 is explained in conjunction with elements from FIG. 1. With reference to FIG. 2, there is shown a block diagram 200 of the electronic device 102. The block diagram 200 of the electronic device 102 may include circuitry 202, a memory 204, an input/output (I/O) device 206, and a network interface 208. The memory 204 may store the ARN 106. The input/output (I/O) device 206 may include a display device 210. Furthermore, the ARN 106 may include an emotion recognition network 106A, a posture recognition network 106B, and a hand gesture recognition network 106C.

The circuitry 202 may include suitable logic, circuitry, and/or interfaces that may be configured to execute program instructions associated with different operations to be executed by the electronic device 102. The circuitry 202 may include one or more processing units, which may be implemented as a separate processor. In an embodiment, one or more processing units may be implemented as an integrated processor or a cluster of processors that perform the functions of the one or more specialized processing units, collectively. The circuitry 202 may be implemented based on a number of processor technologies known in the art. Examples of implementations of the circuitry 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 204 may include suitable logic, circuitry, interfaces, and/or code that may be configured to store one or more instructions to be executed by the circuitry 202. The one or more instructions stored in the memory 204 may be used to execute the different operations of the circuitry 202 (and/or the electronic device 102). The memory 204 may be further configured to store the ARN 106, an emotion recognition network 106A, a posture recognition network 106B, a hand gesture recognition network 106C, and a contrastively trained neural network 212. the training data for the ARN 106, the emotion recognition network 106A, the posture recognition network 106B, the hand gesture recognition network 106C, and the contrastively trained neural network 212 (for example, the set of still assets 112A, the set of motion assets 112B) are provided by the user device 114. The memory may store the ARN 106, the emotion recognition network 106A, the posture recognition network 106B, the hand gesture recognition network 106C, and the contrastively trained neural network 212 in a file format. The memory 204 may be a persistent memory, a non-persistent memory, or a combination thereof. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The ARN 106 may be the computational network or the system of artificial neurons, to recognize specific attributes or features of the performer 118A in the sequence of input images 118 and to learn the recognized attributes. The system of artificial neurons that the ARN 106 uses is the CNN to extract plurality of performance attributes of the performer 118A. For example, the plurality of performance attributes that are extracted may include an emotional attribute, a posture attribute, a hand gesture attribute, a foot attribute, and the like. The ARN 106 extracts features from each of the plurality of performance attributes, further the extracted features are treated as multi-label classification tasks. Herein, the multi-label classification helps the ARN 106 maps inputs to binary vectors. For example, the inputs may include videos, images, higher layer size grids, and the like. Alternatively, in some embodiments, the artificial neurons in the ARN 106 may be implemented using a combination of hardware and software.

In an embodiment, the ARN 106 is a multi-head neural network that includes the emotion recognition network 106A, the posture recognition network 106B and the hand gesture recognition network 106C. Further, the ARN 106 may be applied to the localized instance of the performer 118A to determine the plurality of performance attributes.

The emotion recognition network 106A is a network that uses machine learning (ML) algorithm and CNN to analyze, interpret and classification of a human emotion. The emotion recognition network 106A may analyze positional information of the set of facial features, body language based on body posture and gestures to recognize human emotion. The emotion recognition network 106A may be enabled to recognize human emotion in real time based on real-time data input. Furthermore, the emotion recognition network 106A may use context aware techniques to improve accuracy of emotion detection in case of noisy data input. The context aware techniques for emotion recognition network 106A may include CAER-Net that analyze the set of facial features along with context information of joints.

In an embodiment, the emotion recognition network 106A may be applied on the localized instance of the performer 118A to detect a state of each facial feature of the set of facial features. Further, the emotion recognition network 106A encodes the detected state of each facial feature of the set of facial features into a sequence of characters. The sequence of characters may be included in the positional information for each facial feature of the set of facial features. Furthermore, the set of facial features includes an eye gaze feature, an eyebrow feature, a nasal feature, a lips feature, and a forehead twitch feature.

The posture recognition network 106B may be a system that uses machine learning (ML) algorithm and artificial intelligence (AI) to analyze and recognize human posture. The key points of the human body in the image frame is combined with AI to estimate and recognize human posture. In another embodiment, the posture recognition network 106B may be a sensor based to collect the position information of each key point of the human body.

In an embodiment, the posture recognition network 106B may be applied on the localized instance of the performer to detect key points on the body and detect a dance posture associated with the body movement discipline based on the detected key points. Herein, the posture attribute indicates the dance posture. For example, the posture recognition network 106B may be a Kinect, a hybrid of fuzzy logic and Machine learning, a convolutional neural network (CNN), and the like.

The hand gesture recognition network 106C may be a system that identifies and interpret hand gestures based on ML. The hand gesture recognition network 106C receives input data such as the localized information associated with the image frame to identify hands in the image frame. Further, the hand gesture recognition network 106C detects finger joints of the human in the image frame to recognize the hand gesture. Furthermore, the hand gesture recognition network 106C classifies the recognized hand gesture of the human in the image frame.

In an embodiment, the hand gesture recognition network 106C may be applied on the localized instance of the performer to detect finger joints in each hand of the performer; and determine gesture information based on positions of the detected finger joints. Herein, the gesture information indicates a symbolic hand position that expresses a meaning, an emotion, or a rhythmic experience at a time-instant in the physical performance. For example, the hand gesture recognition network 106C may be a transformer-based gesture recognition engine, a fine-tuned CNN, a deep CNN, a Deep Q-Network, a 3D-CNN model, and the like.

The contrastively trained neural network 212 may correspond to a system that may be trained to recognize similarity between data points. For example, the data points may be a metadata and the data stored in the database 110. The similarity may be recognized by contrastive loss function that generates similar embeddings for similar inputs and dissimilar embeddings for dissimilar inputs. For example, a vector similarity score may be computed between an input vector search query and each asset of the plurality of assets of the performance database (for example, the performance database 804A-804N). The input vector search query may be generated based on the application of contrastively trained neural network 212 on the metadata. Herein, the metadata may be generated for the image frame based on the plurality of performance attributes.

In an embodiment, the contrastively trained neural network 212 may be applied to a metadata of the image frame. Herein, the metadata may be generated based on the plurality of performance attributes. The contrastively trained neural network 212 may be applied to the metadata to generate a first vector search query (for example, at least one of the first vector search query 812A-812N associated with frame 0 to frame N). The generated first vector search query may be an input to the performance database to compute the vector similarity score between the input first vector search query and each asset of the plurality of assets of the performance database.

In an embodiment, the contrastively trained neural network 212 allows electronic device 102 to uniquely capture the plurality of performance attributes of highly expressive body movement disciplines, such as Kuchipudi, Kathakali, Bharatnatyam, and the like.

In an embodiment, in contrastively training of the neural network, one or more parameters of each node of the neural network may be updated based on whether an output of the final layer for a given input (from the training dataset) matches a correct result based on a loss function for the neural network. The above process may be repeated for the same or a different input until a minima of loss function may be achieved, and a training error may be minimized. Several methods for training are known in art, for example, gradient descent, stochastic gradient descent, batch gradient descent, gradient boost, meta-heuristics, and the like.

The contrastively trained neural network 212 may include electronic data, which may be implemented as, for example, a software component of an application executable on the electronic device 102. The contrastively trained neural network 212 may rely on libraries, external scripts, or other logic/instructions for execution by a processing device, such as circuitry 202. The contrastively trained neural network 212 may include code and routines configured to enable a computing device, such as circuitry 202 to perform one or more operations for uniquely capturing the plurality of performance attributes of highly expressive body movement disciplines, such as Kuchipudi, Kathakali, Bharatnatyam, and the like. Additionally, or alternatively, the contrastively trained neural network 212 may be implemented using hardware including a processor, a microprocessor (e.g., to perform or control performance of one or more operations), a field-programmable gate array (FPGA), or an application-specific integrated circuit (ASIC). Alternatively, in some embodiments, the neural network may be implemented using a combination of hardware and software.

The I/O device 206 may include suitable logic, circuitry, interfaces, and/or code that may be configured to receive an input and provide an output based on the received input. For example, the I/O device 206 may receive the sequence of input images that depicts a physical performance. The I/O device 206 may be further configured to display or render the plurality of performance attributes associated with the performer based on application of an attribute recognition network on the localized instance (such as a mudra) The I/O device 206 may include the display device 210. Examples of the I/O device 206 may include, but are not limited to, a display (e.g., a touch screen), a keyboard, a mouse, a joystick, a microphone, or a speaker. Examples of the I/O device 206 may further include braille I/O devices, such as braille keyboards and braille readers.

The network interface 208 may include suitable logic, circuitry, interfaces, and/or code that may be configured to facilitate communication between the electronic device 102 and the server 108, via the communication network 116. The network interface 208 may be implemented by use of various known technologies to support wired or wireless communication of the electronic device 102 with the communication network 116. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 208 may be configured to communicate via wireless communication with networks, such as the Internet, an Intranet, a wireless network, a cellular telephone network, a wireless local area network (LAN), or a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), $5^{th}$ Generation (5G) New Radio (NR), code division multiple access (CDMA), time division multiple access (TDMA), Bluetooth, Wireless Fidelity (Wi-Fi) (such as IEEE 1002.11a, IEEE 1002.11b, IEEE 1002.11g or IEEE 1002.11n), voice over Internet Protocol (VOIP), light fidelity (Li-Fi), Worldwide Interoperability for Microwave Access (Wi-MAX), a protocol for email, instant messaging, and a Short Message Service (SMS).

The display device 210 may include suitable logic, circuitry, and interfaces that may be configured to display or render the search result in response to the vector search query, respectively. The display device 210 may be a touch screen which may enable a user to provide a user-input via the display device 210. The touch screen may be at least one of a resistive touch screen, a capacitive touch screen, or a thermal touch screen. The display device 210 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 210 may refer to a display screen of a head mounted device (HMD), a smart-glass device, a see-through display, a projection-based display, an electro-chromic display, or a transparent display. Various operations of the circuitry 202 for implementation of the multi-head neural network for plurality of attributes recognition, for example, in FIG. 4, and the contrastively trained neural network 212 to generate first vector query, for example, in FIG. 8.

Figure 3:
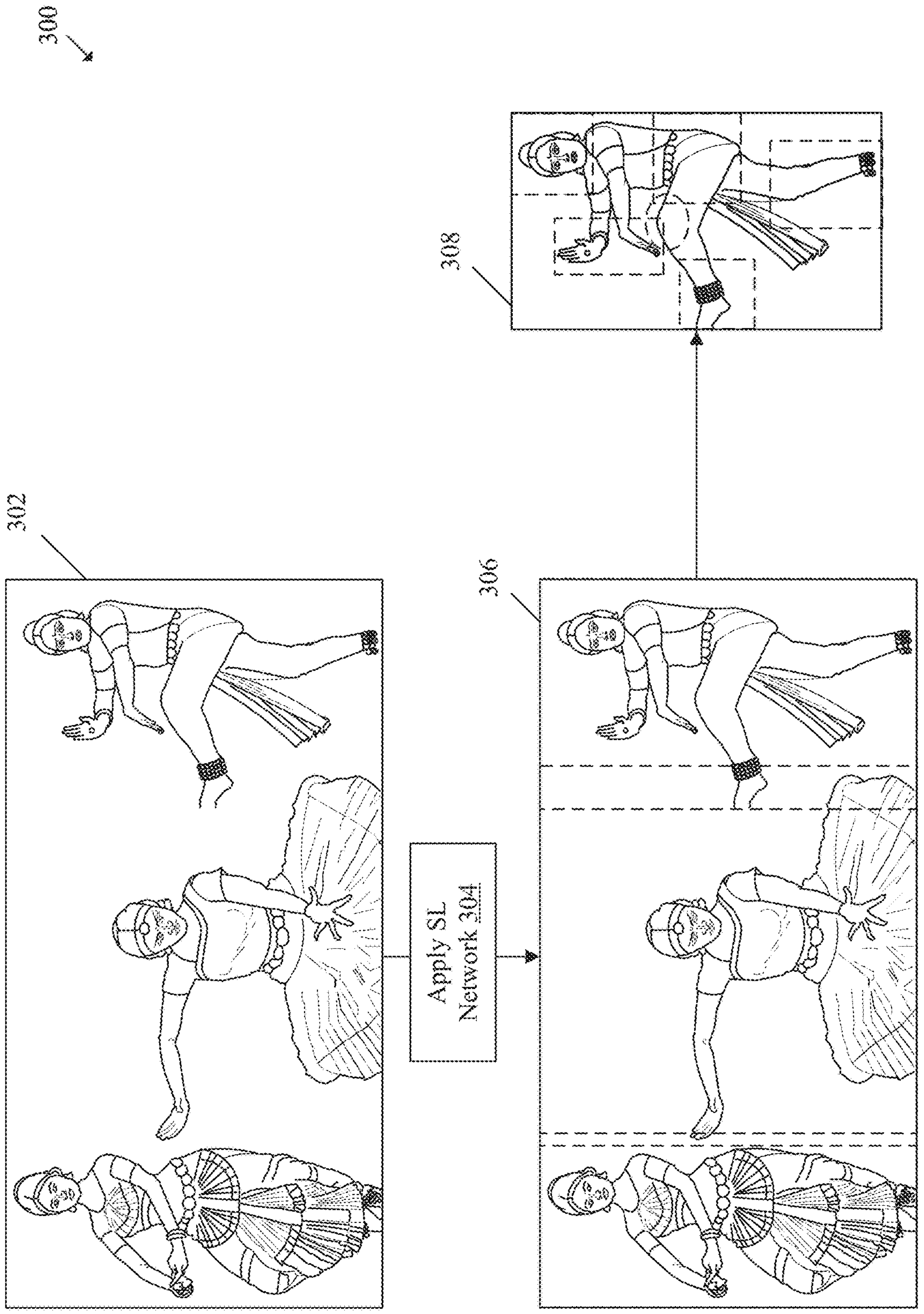
FIG. 3 is a diagram that illustrates an exemplary application of segregation and localization (SL) network, in accordance with an embodiment of the disclosure.

FIG. 3 illustrates an exemplary application of the segregation and localization (SL) network, in accordance with an embodiment of the disclosure. FIG. 3 is explained in conjunction with elements from FIG. 1 and FIG. 2. With reference to FIG. 3, there is shown a diagram 300 depicting an exemplary scenario for the process of the SL network 304. In this scenario, the SL network 304 is shown to be applied to an image frame to segregate at least one performer (such as performer 118A) from the image frame and generate localization information for producing localized instances.

The sequence of input images 118 may be received by the circuitry 202. The circuitry 202 may select at least one image frame (such as image frame 302) from the sequence of input images 118. The image frame 302 depicts a physical performance associated with a body movement discipline. In this case, the image frame 302 may include multiple performers associated with the physical performance. Examples of body movement disciplines associated with the physical performance may include, but are not limited to, Indian classical dance forms such as Bharatanatyam, Kuchipudi, Kathakali, Kathak, Odissi, Sattriya, Manipuri, and Mohiniyattam, yoga forms such as Kundalini Yoga, Vinyasa Yoga, Ashtanga Yoga, Bikram Yoga and surya namaskar, and martial arts such as Kung Fu, Judo, Karate, Wing Chun, Kumdo, and Tai Chi Chuan.

In some aspects, the multiple performers in the image frame 302 may be in different postures from one another. For example, in image frame 302, all the performers shown may be in different postures, with each performer depicting a different aspect of the body movement discipline. In other aspects, all the performers in the selected image frame may be in the same posture (not shown).

The circuitry 202 may be configured to apply the SL network 304 to the selected image frame 302. The SL network 304 may analyze the image frame 302 pixel-by-pixel and identify the boundaries of each performer among the multiple performers, as shown in the localized instance 306. Furthermore, the SL network 304 may be configured to segregate at least one of the performers for further analysis.

The SL network 304 may be further configured to generate localization information. Based on this localization information, a plurality of localized instances 308 may be extracted. For example, the plurality of localized instances 308 may include a localized instance identifying and bordering the head of the performer, a localized instance identifying and bordering the posture of the performer, and a localized instance identifying and bordering the hands of the performer (as shown in 308). These localized instances 308 may be identified and bordered for further analysis of the performers in the selected image frame 302. The localized instance around the head may be processed for emotion recognition, the localized instance around the posture may be processed for posture recognition, and the localized instance around the hands may be processed for hand gesture recognition.

For example, the SL network 304 may segregate each performer from the multiple performers in the selected image frame 302 and further provide localization information for each performer. This localization information may include bounding boxes as shown at 308.

Figure 4:
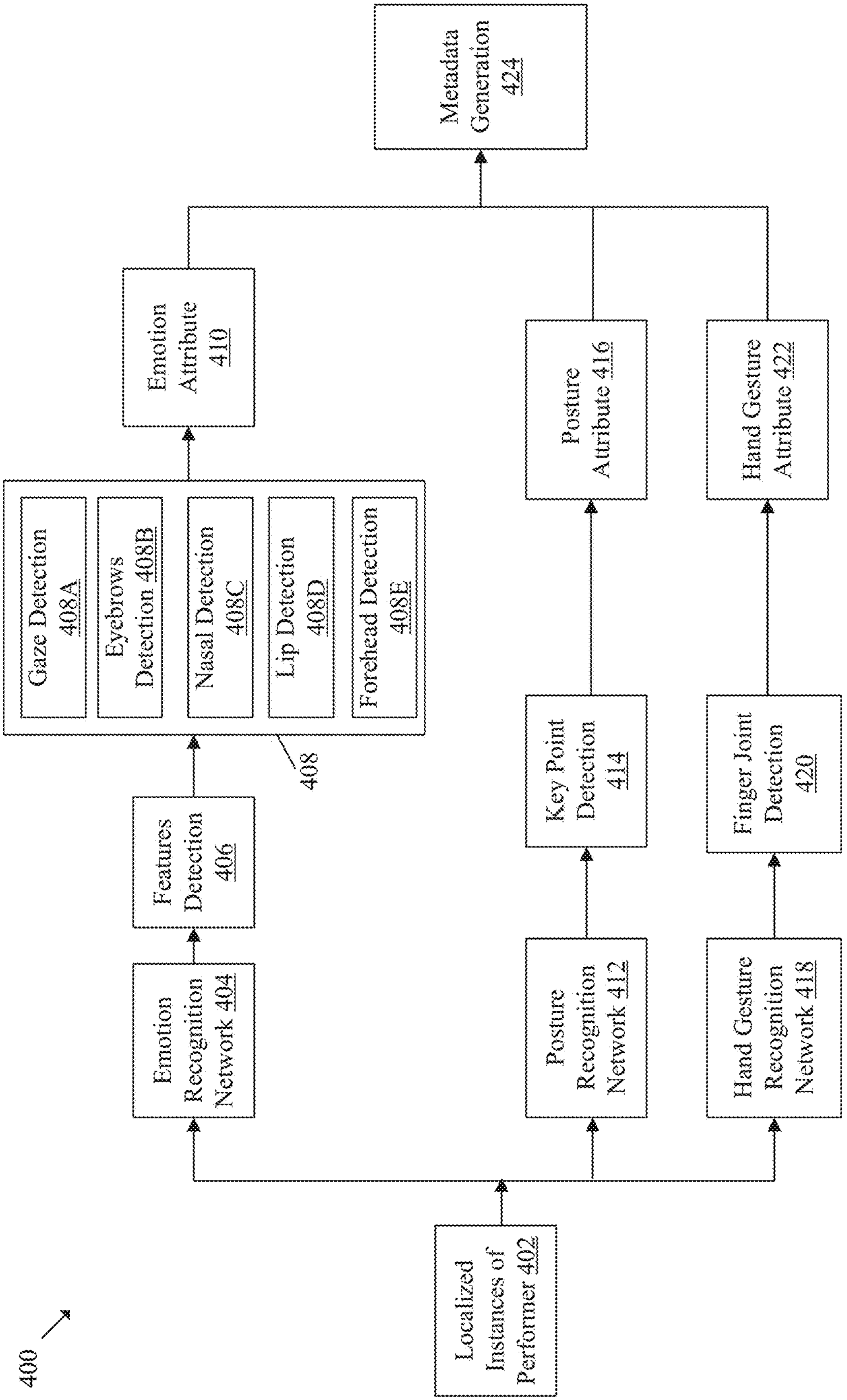
FIG. 4 is a diagram that illustrates an exemplary scenario of metadata generation, in accordance with an embodiment of the disclosure.

FIG. 4 is a diagram that illustrates an exemplary application of metadata generation, in accordance with an embodiment of the disclosure. FIG. 4 is explained in conjunction with elements from FIG. 1, FIG. 2, and FIG. 3. With reference to FIG. 4, there is shown a diagram 400 depicting an exemplary scenario for the generation of metadata. In this scenario, the ARN 106 is shown to be applied to localized instances of each performer in the image frame to generate metadata associated with each performer (such as performer 118A).

In the diagram 400, the ARN 106 may be applied to the extracted localized instances of performers to determine a plurality of performance attributes. To determine each performance attribute of the plurality of performance attributes, the ARN 106 comprising an emotion recognition network 404, a posture recognition network 412, and a hand gesture recognition network 418 may be used.

The localized instance of performer 402 may be received to generate metadata associated with the performer 118A and may be associated with the localized instances 308. Further, the localized instance of performer 402 may be identified and localized (within a bounding box, for example) based on the application of the SL network 304. For example, the localized instance of performer 402 may be associated to the bounding box of at least one of the localized instances (such as, localized instances in 308 of FIG. 3).

The emotion recognition network 404 may be applied to one of the localized instances of the performer 402 for features detection 406. The features detection 406 may include detection of the set of facial features, gaze detection 408A, eyebrows detection 408B, nasal detection 408C, lips detection 408D, forehead detection 408E, and the like. Further, each of the features from the features detection 406 may be combined to correspond to an emotion attribute 410. For example, the emotion attribute 410 may be determined by tracking the performer's gaze, eyebrow movement, lip movement, and overall facial expression.

The posture recognition network 412 may be applied to one of the localized instances of the performer 402 for the key point detection 414. The key points may include points on various parts of the body. Based on the key point detection 414, a posture attribute 416 may be determined.

The hand gesture recognition network 418 may be applied to one of the localized instances of the performer 402 for the finger joint detection 420 of each finger associated with both hands. A hand gesture attribute 422 for each hand may be generated based on the detected finger joints.

The ARN 106 may generate metadata (such as the metadata generation 424) for the image frame based on the determined plurality of performance attributes (including the emotion attribute 410, the posture attribute 416, and the hand gesture attribute 422). For example, the metadata may be generated based on various combinations and permutations of the plurality of performance attributes. The generated metadata may uniquely identify a specific stance, deity representation, or situation depicted by the localized instance in the image frame associated with the body movement discipline.

Figure 5:
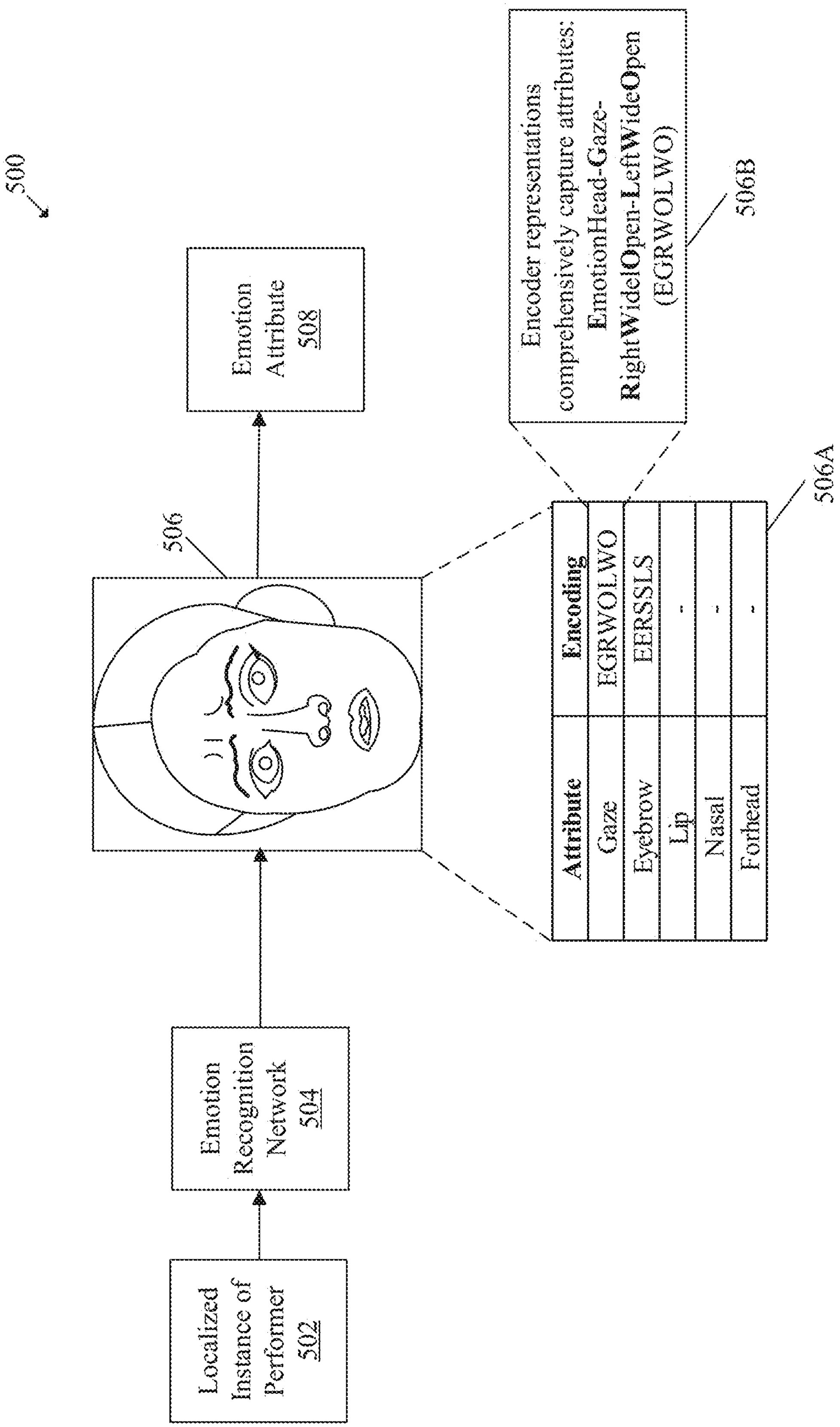
FIG. 5 is a diagram that illustrates an exemplary scenario of emotion recognition network, in accordance with an embodiment of the disclosure.

FIG. 5 is a diagram that illustrates an exemplary application of an emotion recognition network, in accordance with an embodiment of the disclosure. FIG. 5 is explained in conjunction with elements from FIG. 1, FIG. 2, FIG. 3, and FIG. 4. With reference to FIG. 5, there is shown a diagram 500 depicting an exemplary scenario for the generation of an emotion attribute. In this exemplary scenario, the ARN 106 is shown to be applied to a face 506 in a localized instance of the performer (such as performer 118A) in the image frame to generate the emotion attribute.

In the diagram 500, the emotion recognition network 504 may receive the localized instance of performer 502 associated with the head of the performer 118A. The emotion recognition network 504 may use machine learning (ML) algorithms and convolutional neural networks (CNNs) to analyze, interpret, and classify the set of facial expressions of the performer 118A.

In some aspects, the emotion recognition network 504 may be applied to the localized instance of the performer 118A to detect the state of each facial feature in the set of facial features. Further, the emotion recognition network 504, using the circuitry 202, may encode the detected state of each facial feature into a sequence of characters (as shown in a table 506A). This sequence of characters may be included in the positional information for each facial feature. The set of facial features may include, for example, an eye gaze feature, an eyebrow feature, a nasal feature, a lips feature, and a forehead feature. In some embodiments, the set of facial features may be combined to determine the emotion attribute. Different permutations and combinations of the set of facial features may represent multiple emotion attributes. For example, the eye gaze may be encoded as EGRWOLWO, as shown in the table 506A, which is provided in a description 506B as "EmotionHead-Gaze-Right-WideOpen-LeftWideOpen". Similarly, the eyebrows may be encoded as EERSSLS, as shown in the table 506A. Similar to eye gaze encodings and eyebrows encoding, the emotion recognition network 504 may encode other facial features in the set of facial features. Furthermore, each facial feature of the set of facial features may be encoded into the sequence of characters to determine an emotion attribute 508 associated with the performer 118A. For example, as shown in 506 of FIG. 5, the emotion attribute 508 of the performer 118A may be determined to be scared based on table 506A along with the description 506B.

Figure 6:
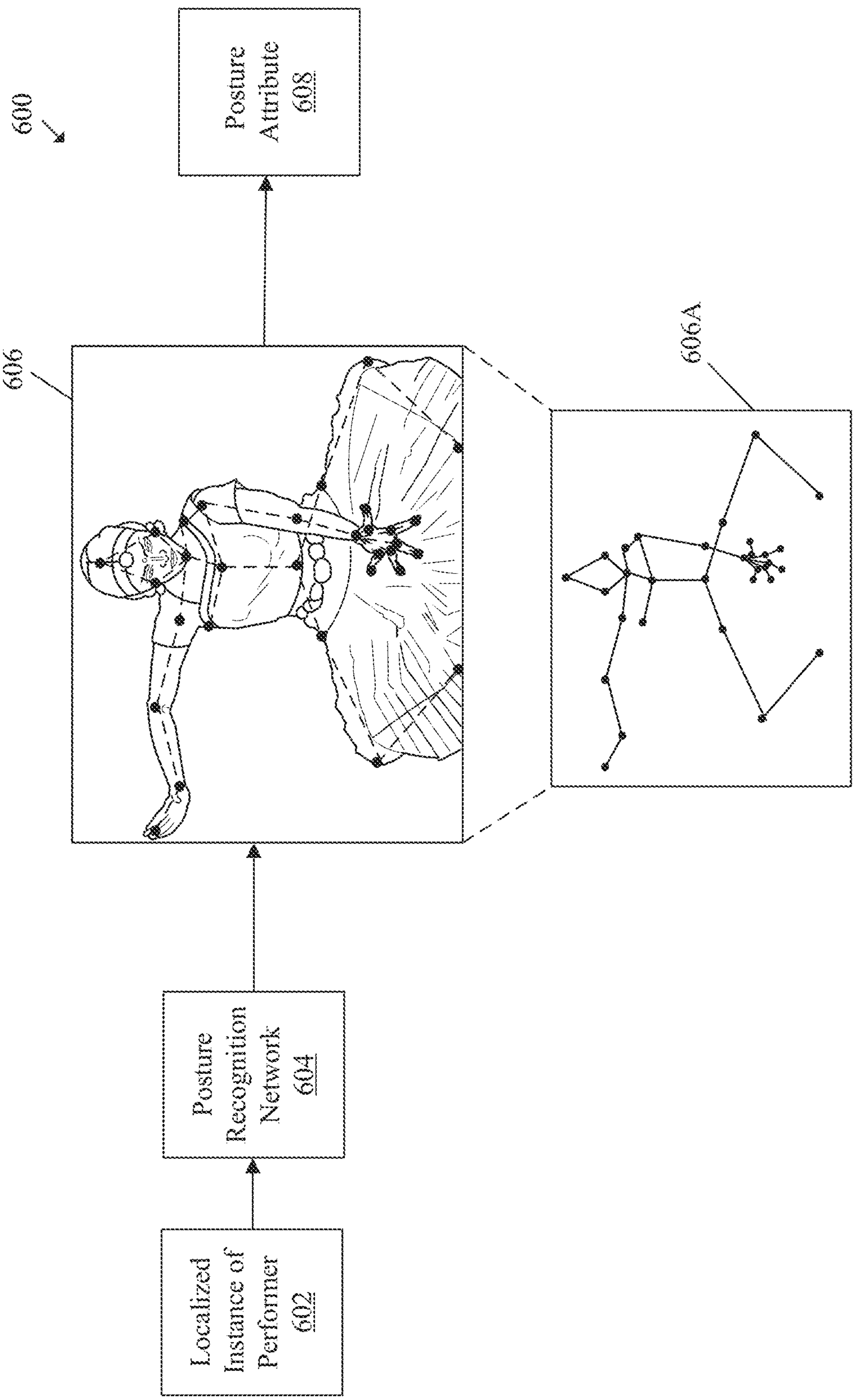
FIG. 6 is a diagram that illustrates an exemplary scenario of posture recognition network, in accordance with an embodiment of the disclosure.

FIG. 6 is a diagram that illustrates an exemplary application of a posture recognition network, in accordance with an embodiment of the disclosure. FIG. 6 is explained in conjunction with elements from FIG. 1, FIG. 2, FIG. 3, FIG. 4, and FIG. 5. With reference to FIG. 6, there is shown a diagram 600 depicting an exemplary scenario for the generation of a posture attribute. In this exemplary scenario, the ARN 106 is shown to be applied to a localized instance 602 of the performer (such as performer 118A) in the image frame to generate the posture attribute.

In the diagram 600, the posture recognition network 604 may receive the localized instance 602 of the performer associated with the posture of the body of the performer 118A. The posture recognition network 604 may use machine learning (ML) algorithms or artificial intelligence (AI) techniques to analyze and recognize human posture. In some aspects, the key points (as shown in 606A of FIG. 6) of the performer in the image frame may be combined with AI techniques to estimate and recognize human posture.

Each key point of the human body may be represented with respect to other key points. For example, the key points may be detected based on the localized instance 602 of the performer 118A (as shown in 606), and the relationships between the key points (as illustrated in 606A). The posture recognition network 604 may generate a posture attribute 608 based on the detected key points and the relationships between these key points. In this context, the posture attribute may indicate the dance posture or stance. For instance, the detected key points may include identification of various body joints of the performer 118A, which collectively define the overall posture.

Figure 7:
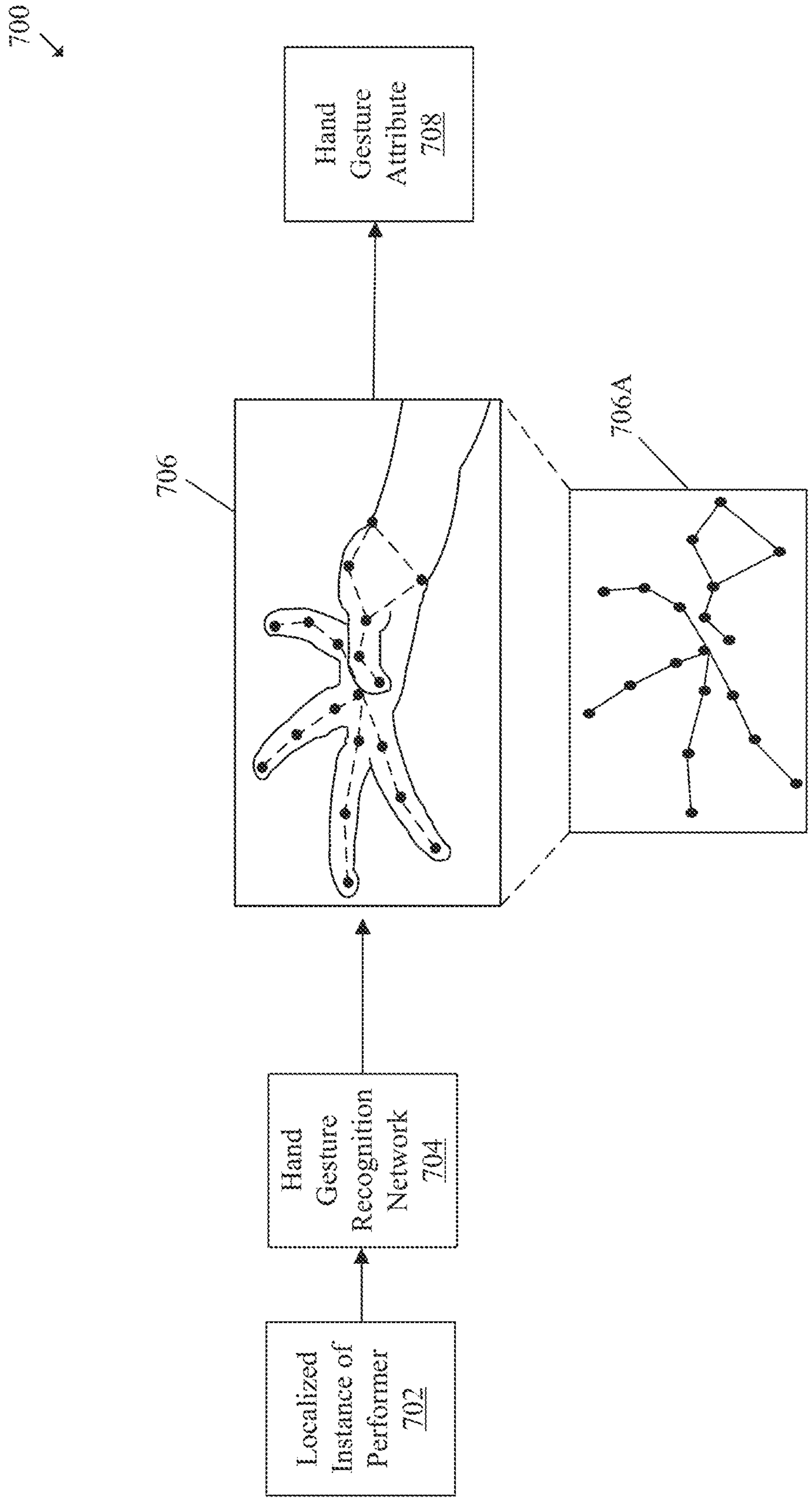
FIG. 7 is a diagram that illustrates an exemplary scenario of hand gesture recognition network, in accordance with an embodiment of the disclosure.

FIG. 7 is a diagram that illustrates an exemplary application of a hand gesture recognition network, in accordance with an embodiment of the disclosure. FIG. 7 is explained in conjunction with elements from FIG. 1, FIG. 2, FIG. 3, FIG. 4, FIG. 5, and FIG. 6. With reference to FIG. 7, there is shown a diagram 700 depicting an exemplary scenario for the generation of a hand gesture attribute 708. In this exemplary scenario, the ARN 106 is shown to be applied to a localized instance of performer 702 (such as performer 118A) in the image frame to generate the hand gesture attribute.

The hand gesture recognition network 704 may receive the localized instance of performer 702 associated with both hands of the performer. The hand gesture recognition network 704 may use machine learning (ML) or artificial intelligence (AI) based algorithms to analyze and recognize hand gestures of the performer, as shown in 706. In some aspects, the finger joints (as shown in 706A) of the performer may be used to recognize the hand gestures. Furthermore, the hand gesture recognition network 704 may classify the recognized hand gesture of the performer in the image frame.

In some embodiments, each finger joint of the performer may be represented with respect to other finger joints. For example, the finger joints of each hand may be detected based on the application of the hand gesture recognition network 704 on the localized instance of performer 702. Further, the hand gesture recognition network 704 may determine gesture information based on positions of the detected finger joints. In this context, the gesture information may indicate a symbolic hand position that expresses a meaning, an emotion, or a rhythmic experience at a specific time-instant in the physical performance.

The hand gesture attribute 708 may represent a root mudra from a plurality of root mudras associated with the body movement discipline. For example, the hand gesture attribute 708 may include various mudras such as Tripataka, Ardhachandra, Mushti, Pataka, Mayura, Katakamukha, Padmakosha, Suchi, Chakra, and others.

Figure 8:
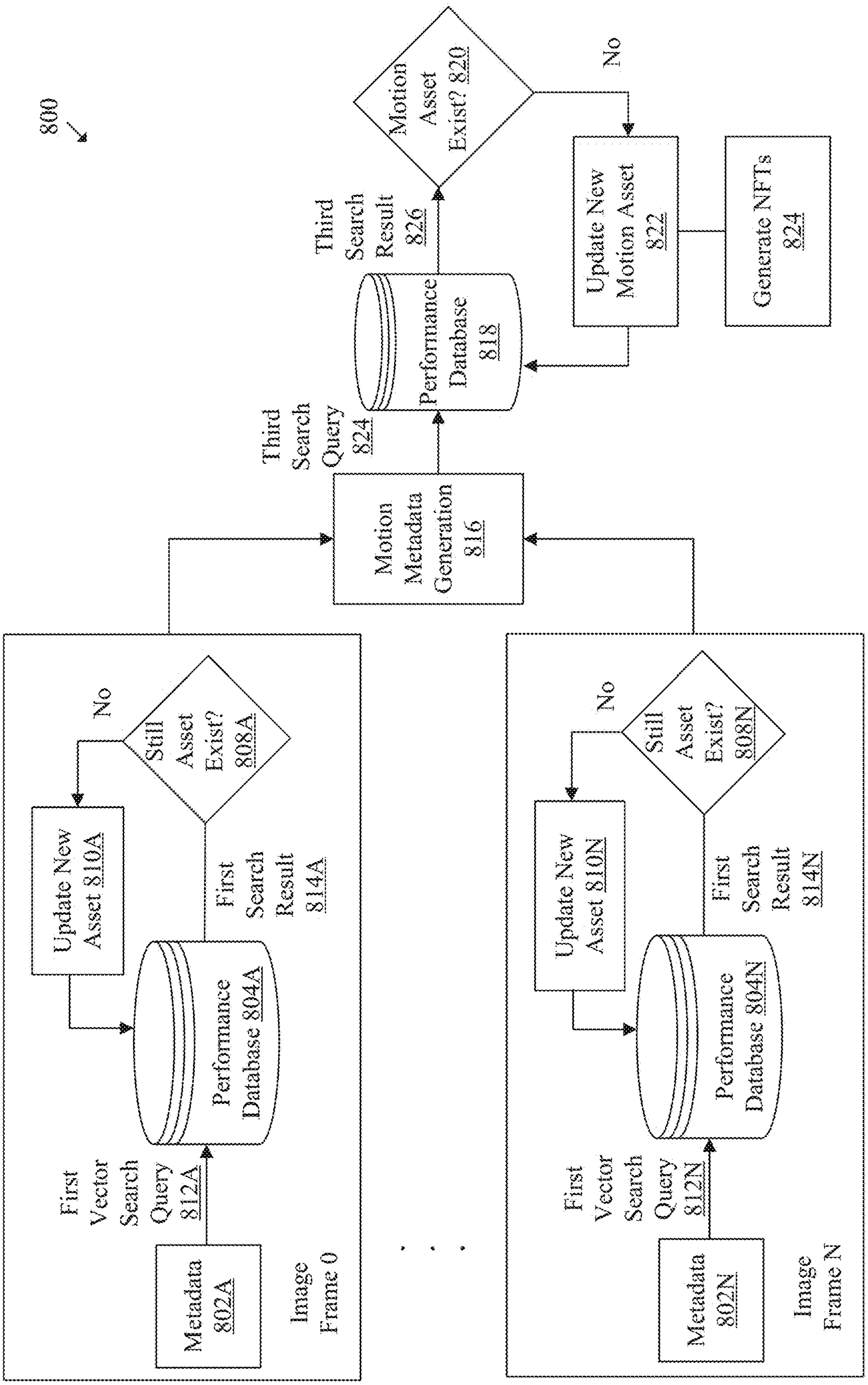
FIG. 8 is a diagram that illustrates an exemplary scenario of vector search, in accordance with an embodiment of the disclosure.

FIG. 8 is a diagram that illustrates an exemplary application of vector search, in accordance with an embodiment of the disclosure. FIG. 8 is explained in conjunction with elements from FIG. 1, FIG. 2, FIG. 3, FIG. 4, FIG. 5, FIG. 6, and FIG. 7. With reference to FIG. 8, there is shown a diagram 800 depicting an exemplary scenario for vector search of still assets and motion assets.

In some aspects, metadata (such as, metadata 802A-802N) may be generated for image frames (such as frame 0 to frame N) based on a plurality of performance attributes. Upon generation, the metadata may be tagged. The metadata associated with each image frame may include information and details of the plurality of performance attributes of that frame. The contrastively trained neural network 212 may be applied to metadata 802A-802N to generate first vector search queries 812A-812N. These first vector search queries 812A-812N may serve as inputs to the performance database 804A-804N. The performance database 804A-804N may include a plurality of assets, such as the set of still assets 112A. These assets may include embedding information, metadata 802A-802N, and tags associated with the metadata 802A-802N. The embedding information may encode registered poses of the body movement discipline. The metadata 802A-802N may be associated with each registered pose and a source image frame depicting that pose.

In some embodiments, a registered pose may represent a mudra of a plurality of mudras in the body movement discipline. The mudra may be a key dance step comprising a root mudra associated with the hand gesture attribute 422, a posture associated with the body based on the posture attribute 416, and an emotion associated with the emotion attribute 410.

The circuitry 202 may be configured to compute vector similarity scores between the generated first vector search queries 812A-812N and each asset in the performance database 804A-804N. The circuitry 202 may then generate first search results 814A-814N based on vector similarity scores that fall below a threshold similarity score. These first search results 814A-814N may indicate that the metadata (such as metadata 802A-802N) represents an unregistered pose of the body movement discipline. The circuitry 202 may be configured to check if a still asset exists (for example, still asset exist 808A-808N) in the performance database 804A-804N. Herein, when the still asset exist (for example, still asset exist 808A-808N) in the performance database 804A-804N, then the metadata is represented as a registered pose. Further, when the still asset does not exist in the performance database 804A-804N, then the metadata is represented as an unregistered pose. If the metadata represents the unregistered pose, the circuitry 202 may update the performance database 804A-804N to include this metadata. The updated metadata may be referred to as a new registered pose (shown at 810A-810N in FIG. 8) of the body movement discipline. Thus, the new registered pose may serve as a tag assigned to the previously unregistered pose.

For instance, the circuitry 202 may update the performance database 804A-804N to register metadata 802A-802N when it is identified as a combination of unique emotion attributes, posture attributes, and hand gesture attributes not previously registered in the performance database 804A-804N.

In some aspects, combinations of metadata per performer (such as performers at 302 in FIG. 3) may be consolidated across image frames to generate motion metadata (as shown in 816 of FIG. 8). This motion metadata may be generated based on input from each image frame in the sequence (i.e., a plurality of new registered poses of the body movement discipline in the performance database 804A-804N). The circuitry 202 may generate a third vector search query 824 by applying the contrastively trained neural network 212 to the generated motion metadata. This third vector search query 824 may serve as input to a performance database 818 to compute vector similarity scores between the third vector search query 824 and each asset in the performance database 818. The performance database 818 may include a plurality of motion assets, such as the set of motion assets 112B. These motion assets may include embedding information, metadata, and associated tags. The embedding information may encode registered motions of the body movement discipline. The metadata may be associated with each registered motion and a set of source image frames depicting that motion.

In an embodiment, the performance database 804A-804N may store the set of still assets 112A and the performance database 818 may store the set of motion assets 112B. Alternatively, in another embodiment, the performance database 804A-804N may store the set of motion assets 112B and the performance database 818 may store the set of still assets 112A.

The circuitry 202 may compute vector similarity scores between the generated third vector search query 824 and each motion asset in the performance database 818. It may then generate a third search result 826 based on vector similarity scores falling below a threshold similarity score. This third search result 826 may indicate that the motion metadata (as shown in 816) represents an unregistered motion of the body movement discipline. The circuitry 202 may be configured to check if a motion asset exist (for example, motion asset exist 820) in the performance database 818. Herein, when the motion asset exist (for example, motion asset exist 820) in the performance database 818, then the metadata is represented as a registered motion. Further, when the still asset does not exist in the performance database 818, then the metadata is represented as an unregistered motion. If the motion metadata represents the unregistered motion, the circuitry 202 may update the performance database 818 to include this motion metadata as a new registered motion (shown at 822) of the body movement discipline. Thus, the new registered motion may serve as a tag assigned to the previously unregistered motion.

For example, the circuitry 202 of the electronic device 102 may update the performance database 804A-804N or 818 to store new assets such as new registered poses or new registered motions. These databases may be updated upon detection of unregistered poses or motions based on the first search results 814A-814N or third search result 826, respectively.

In an exemplary embodiment, a set of non-fungible tokens (NFTs) may be generated for each of the new assets stored at the performance database 804A-804N. Alternatively, the NFTs may be generated for each of the new motion assets stored at the performance database 818 as shown at 824 in FIG. 8. The NFTs may be tokenized via a blockchain technology. The NFT generation may leverage blockchain technology, that may ensure authenticity and uniqueness of the NFTs. Each NFT of the set of NFTs may be associated with the metadata such as the metadata 802A-802N or the metadata 816.

The metadata may define the new assets or the new motion assets and includes information about the physical performance such as the emotion attribute 410, the posture attribute 416, or the hand gesture attributes 422. The metadata associated with each NFT of the set of NFTs may enhance the value of each NFT and provide additional context for each of the NFT. Further, the NFTs may be assigned to the users or participants that may create the new assets or new motion assets. The assignment of NFTs may be performed through a secure authentication process that may verify ownership rights of the users or participants.

For instance, a marketplace may be established for the users to participate and showcase the generated NFTs for trade the generated NFTs or other applications. The marketplace may allow the users to buy, sell, or exchange NFTs associated with the new assets or motion assets associated with the physical performance, such as Bharatnatyam pose assets, martial art pose assets, yoga pose assets, and the like. Further, smart contracts may be implemented to govern the transactions and ownership transfers within the NFT marketplace. The smart contracts may ensure the ownership rights and may also ensure that the transactions of NFTs are executed securely and transparently. Furthermore, a royalty mechanism may be integrated into the NFT marketplace, allowing the users or performers to receive royalties on the sold or traded NFTs. The royalty may incentivize the users or performers to create and share the new assets or new motion assets and also benefit from the same.

Figure 9:
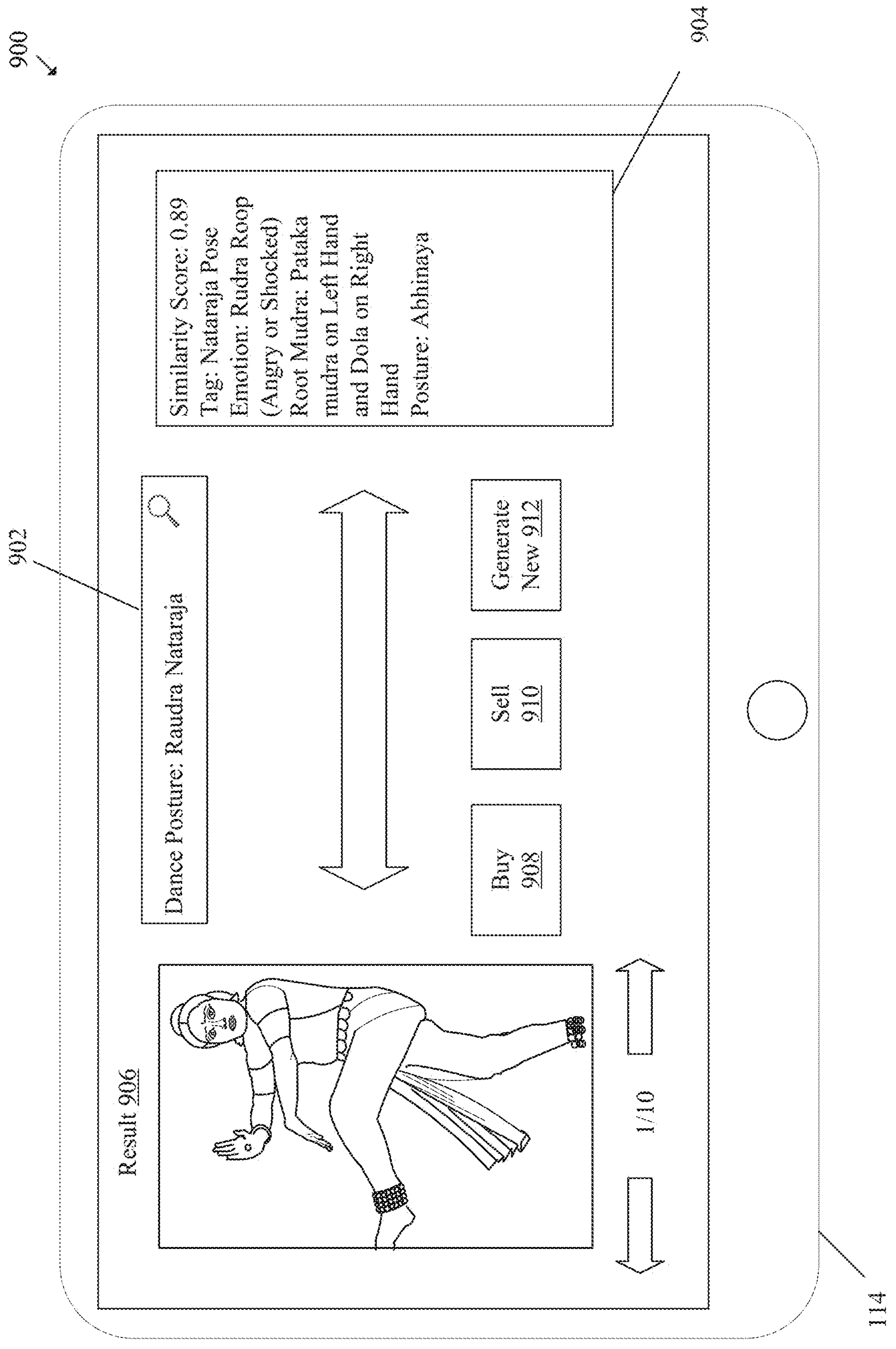
FIG. 9 is a diagram that illustrates an exemplary scenario of user device display, in accordance with an embodiment of the disclosure.

FIG. 9 is a diagram that illustrates an exemplary scenario of a user device display, in accordance with an embodiment of the disclosure. FIG. 9 is explained in conjunction with elements from FIG. 1, FIG. 2, FIG. 3, FIG. 4, FIG. 5, and FIG. 8. With reference to FIG. 9, there is shown a diagram 900 depicting an exemplary scenario for the display of user device 114 for a search query.

The circuitry 202 may be configured to receive a user input via a search bar 902 associated with the body movement discipline. The user input may include at least one of a natural language query or an image-based query. The circuitry 202 may generate a vector search query based on the application of the contrastively trained neural network 212 to the user input. The circuitry 202 may compute similarity scores between the vector search query and each asset of the plurality of assets, such as the still assets from the set of still assets 112A or the motion assets from the set of motion assets 112B stored in the performance database (such as the performance database 804A-804N or the performance database 818). The circuitry 202 may generate the search result that includes the top-k assets of the plurality of assets for which the computed similarity scores are above a threshold score. The circuitry 202 may be configured to control the user device 114 to display a response based on the second search result. The response may include the source image frame that depicts the registered pose in at least one of the top-k assets.

In some aspects, the display of the user device 114 may include a search bar 902, a UI element 904, a preview UI element 906, a buy button 908, a generate new button 910, a sell button 912, and navigation arrows. The navigation arrows may allow the user of the user device 114 to navigate between a plurality of results (such as the top-k assets). The user device 114 may receive the user input on the search bar 902, such as a dance posture query for "Raudra Nataraja." The circuitry 202 may generate the second search result that includes the top-k assets of the plurality of assets as shown in the UI element 904. The display of the user device 114 may include information such as a similarity score of 0.89, a tag of "Nataraja pose," an emotion attribute of "Rudra roop (Angry or Shocked)," a root mudra (hand gesture attribute) of "Pataka mudra on left hand and Dola on right hand," and a posture attribute of "Abhinaya." The preview UI element 906 may present the top-k assets one at a time, with the navigation arrows allowing the user to navigate through the plurality of top-k assets.

In some embodiments, the user device 114 may be configured to display the second search result based on the sequence of similarity scores between the second vector search query and each of the assets in the database 110.

In an embodiment, the buy button 908 on the display of the user device 114 may enable the user to preview the NFTs associated with the assets in the database 110 and make a purchase of the user input on the search bar 902. The user input on the search bar 902 may be associated with the NFTs associated with the assets in the database 110. The generate new button 910 on the display of the user device 114 may enable the user to generate new NFTs that may include new assets. The new assets may be stored in the database 110 upon generation. The sell button 912 on the display of the user device 114 may enable the user to interact with the NFTs associated with the assets in the database 110 and sell the new generated NFTs (new NFTs may be generated using the generate new button 910 on the display of the user device 114). The user input on the search bar 902 may further be associated with the newly generated NFTs and that may be stored as assets on the database 110.

In an embodiment, the display of the user device 114 may be associated with a user-friendly interface that enables the users with seamless navigation and intuitive features to manage the NFTs (newly generated NFTs using generate new button 910 or generate NFTs at 824 in FIG. 8). Alternatively, by tying NFTs to assets created by users using metadata associated with the physical performances, such as Bharatnatyam pose images, Yoga pose, martial art stance, the users or the performers may establish verifiable ownership, showcase talent, and potentially monetize the digital assets in a secure and transparent manner.

Figure 10:
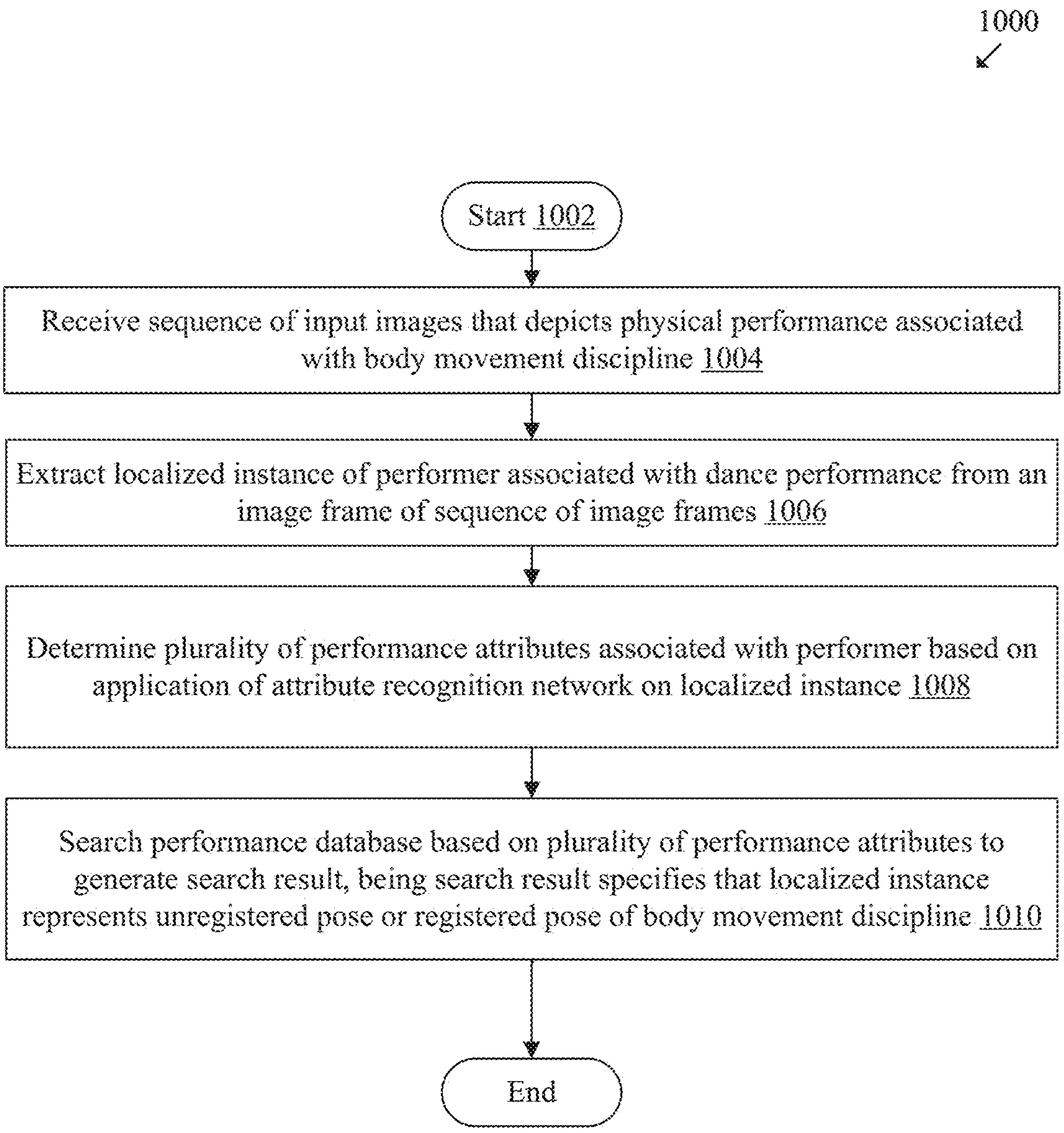
FIG. 10 is a flowchart that illustrates operations of an exemplary method for digitization of human motion data for semantic search, in accordance with an embodiment of the disclosure.

FIG. 10 is a flowchart that illustrates operations of an exemplary method for digitization of motion data based in machine learning, in accordance with an embodiment of the disclosure. FIG. 10 is described in conjunction with elements from FIG. 1, FIG. 2, FIG. 3, FIG. 4, FIG. 5, FIG. 6, FIG. 7, FIG. 8, and FIG. 9. With reference to FIG. 10, there is shown a flowchart 1000. The flowchart 1000 may include operations from 1002 to 1010 and may be implemented by the electronic device 102 of FIG. 1 or by the circuitry 202 of FIG. 2. The flowchart 1000 may start at 1002 and proceed to 1004.

At 1004, the sequence of input images 118 may be received. The circuitry 202 may be configured to receive the sequence of input images 118 that depicts a physical performance associated with a body movement discipline. Details related to sequence of input images 118 are further described, for example, in FIG. 1 (at 118).

At 1006, the localized instance 306 of a performer may be extracted. The circuitry 202 may be configured to extract the localized instance of the performer 118A associated with the physical performance from the image frame of the sequence of image frames. Details related to the localized instance extraction are further described, for example, in FIG. 3 (at 306 in FIG. 3).

At 1008, the plurality of performance attributes (such as, at 410, 416, and 422 of FIG. 4) may be determined. The circuitry 202 may be configured to determine the plurality of performance attributes associated with the performer 118A based on application of the ARN 106 on the localized instance. At 1008A, the plurality of performance attributes may include an emotion attribute, a posture attribute, and a hand gesture attribute. Details related to the performance attribute are further described, for example, in FIG. 4.

At 1010, the performance database, in FIG. 8 (at 804A-804N or 818) may be searched. The circuitry 202 may be configured to search a performance database based on the plurality of performance attributes to generate a search result, wherein the search result specifies that the localized instance represents an unregistered pose or a registered pose of the body movement discipline. Details related to the performance database are further described, for example, in FIG. 8 (at 804A-804N or 818). Control may pass to end.

Although the flowchart 1000 is illustrated as discrete operations, such as, 1004, 1006, 1008, 1008A and 1010 the disclosure is not so limited. Accordingly, in certain embodiments, such discrete operations may be further divided into additional operations, combined into fewer operations, or eliminated, depending on the implementation without detracting from the essence of the disclosed embodiments.

Various embodiments of the disclosure may provide a non-transitory computer-readable medium and/or storage medium having stored thereon, computer-executable instructions executable by a machine and/or a computer to operate an electronic device (for example, the electronic device 102 of FIG. 1). Such instructions may cause the electronic device 102 to perform operations that may include reception of a sequence of input images (for example, the sequence of input images 118 of FIG. 1) that depicts a physical performance associated to a body movement discipline. The operations may further include extraction of a localized instance of a performer associated with the physical performance from the image frame of the sequence of image frames. The operations may further include determination of a plurality of performance attributes associated with the performer 118A based on application of an attribute recognition network on the localized instance. The operations may further include the plurality of performance attributes that comprises: an emotion attribute that includes positional information associated with a set of facial features of the performer 118A, a posture attribute associated with a body of the performer 118A, and a hand gesture attribute associated with each hand of the performer 118A. The operations may further include searches a performance database based on the plurality of performance attributes to generate a search result, wherein the search result specifies that the localized instance represents an unregistered pose or a registered pose of the body movement discipline.

Exemplary aspects of the disclosure may provide an electronic device (such as, the electronic device 102 of FIG. 1) that includes circuitry (such as, The circuitry 202). The circuitry 202 may be configured to receive sequence of input images (for example, the sequence of input images 118 of FIG. 1) depicting a physical performance associated with a body movement discipline. The circuitry 202 may be configured to extract a localized instance of a performer associated with the physical performance from the image frame of the sequence of image frames. The circuitry 202 may be configured to determine a plurality of performance attributes associated with the performer 118A based on application of an attribute recognition network on the localized instance. The plurality of performance attributes comprises an emotion attribute that includes positional information associated with a set of facial features of the performer 118A, a posture attribute associated with a body of the performer 118A, and a hand gesture attribute associated with each hand of the performer 118A. The circuitry 202 may be configured to search a performance database based on the plurality of performance attributes to generate a first search result, wherein the search result specifies that the localized instance represents an unregistered pose or a registered pose of the body movement discipline.

In an embodiment, the body movement discipline is an Indian body movement discipline.

In an embodiment, the circuitry is further configured to apply a segregation and localization (SL) network on the image frame to generate localization information associated with the performer 118A, wherein the localized instance of the performer 118A is extracted based on the localization information.

In an embodiment, the attribute recognition network is a multi-head neural network that includes an emotion recognition network, a posture recognition network, and a hand gesture recognition network.

In an embodiment, the attribute recognition network includes an emotion recognition network, and wherein the circuitry is further configured to apply an emotion recognition network on the localized instance of the performer 118A to detect a state of each facial feature of the set of facial features, and encode the detected state of each facial feature of the set of facial features into a sequence of characters, wherein the positional information includes the sequence of characters for each facial feature of the set of facial features.

In an embodiment, the set of facial features include an eye gaze feature, an eyebrow feature, a nasal feature, a lips feature, and a forehead twitch feature.

In an embodiment, the attribute recognition network includes a posture recognition network, and wherein the circuitry is further configured to apply the posture recognition network on the localized instance of the performer 118A to detect key points on the body and detect a dance posture associated with the body movement discipline based on the detected key points, wherein the posture attribute indicates the dance posture.

In an embodiment, the attribute recognition network includes a hand gesture recognition network, and wherein the circuitry is further configured to apply the hand gesture recognition network on the localized instance of the performer 118A to detect finger joints in each hand of the performer 118A, and determine gesture information based on positions of the detected finger joints, wherein the gesture information indicates a symbolic hand position that expresses a meaning, an emotion, or a rhythmic experience at a time-instant in the physical performance.

In an embodiment, the hand gesture attribute represents a root mudra of a plurality of root mudras of the dance form, the yoga, or the martial art.

In an embodiment, the circuitry is further configured to generate metadata for the image frame based on the plurality of performance attributes, generate a first vector search query based on application of a contrastively trained neural network on the generated metadata, and input the first vector search query to the performance database.

In an embodiment, the performance database includes a plurality of assets, each of which includes, embedding information that encodes a registered pose of the body movement discipline, metadata associated with each of the registered pose and a source image frame that depicts the registered pose, and tags associated with the metadata.

In an embodiment, the registered pose represents a mudra of a plurality of mudras of the dance form and is a key dance step made up of a root mudra associated with the hand gesture attribute, a posture associated with the body, and an emotion associated with the emotion attribute.

In an embodiment, the circuitry is further configured to compute a vector similarity score between the input first vector search query and each asset of the plurality of assets of the performance database and generate the first search result based on the vector similarity score that is below a threshold similarity score. The first search result indicates that the localized instance represents the unregistered pose of the body movement discipline, and update, based on the metadata for the image frame, the performance database to include the localized instance as a new registered pose of the body movement discipline.

In an embodiment, the circuitry is further configured to receive, from a user device, a user input associated with the body movement discipline, wherein the user input includes at least one of a natural language query or an image-based query. The circuitry is further configured to generate a second vector search query based on application of the contrastively trained neural network on the user input. The circuitry is further configured to compute a similarity score between the second vector search query and each asset of the plurality of assets. The circuitry is further configured to generate a second search result that includes a top-k assets of the plurality of assets for which the computed similarity score is above a threshold score and control the user device to display a response based on the second search result, wherein the response includes the source image frame that depicts the registered pose in at least one of the top-k assets.

The present disclosure may also be positioned in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the embodiment disclosed, but that the present disclosure will include all embodiments that fall within the scope of the appended claims.

What is claimed is:

1. An electronic device, comprising:

circuitry configured to:

receive a sequence of input images that depicts a physical performance associated with a body movement discipline;

extract a localized instance of a performer associated with the physical performance from an image frame of the sequence of image frames;

determine a plurality of performance attributes associated with the performer based on application of an attribute recognition network on the localized instance, wherein the plurality of performance attributes comprises:

an emotion attribute that includes positional information associated with a set of facial features of the performer, a posture attribute associated with a body of the performer, and a hand gesture attribute associated with each hand of the performer; and search a performance database based on the plurality of performance attributes to generate a first search result, wherein the first search result specifies that the localized instance represents an unregistered pose or a registered pose of the body movement discipline.

2. The electronic device according to claim 1, wherein the body movement discipline corresponds to an Indian dance form, a martial art, or yoga.

3. The electronic device according to claim 1, wherein the circuitry is further configured to apply a segregation and localization (SL) network on the image frame to generate localization information associated with the performer, wherein the localized instance of the performer is extracted based on the localization information.

4. The electronic device according to claim 1, wherein the attribute recognition network is a multi-head neural network that includes an emotion recognition network, a posture recognition network, and a hand gesture recognition network.

5. The electronic device according to claim 1, wherein the attribute recognition network includes an emotion recognition network, and wherein the circuitry is further configured to:

apply an emotion recognition network on the localized instance of the performer to detect a state of each facial feature of the set of facial features; and encode the detected state of each facial feature of the set of facial features into a sequence of characters, wherein the positional information includes the sequence of characters for each facial feature of the set of facial features.

6. The electronic device according to claim 4, wherein the set of facial features include an eye gaze feature, an eyebrow feature, a nasal feature, a lips feature, and a forehead twitch feature.

7. The electronic device according to claim 1, wherein the attribute recognition network includes a posture recognition network, and wherein the circuitry is further configured to:

apply the posture recognition network on the localized instance of the performer to detect key points on the body; and detect a dance posture associated with the body movement discipline based on the detected key points, wherein the posture attribute indicates the dance posture.

8. The electronic device according to claim 1, wherein the attribute recognition network includes a hand gesture recognition network, and wherein the circuitry is further configured to:

apply the hand gesture recognition network on the localized instance of the performer to detect finger joints in each hand of the performer; and determine gesture information based on positions of the detected finger joints, wherein the gesture information indicates a symbolic hand position that expresses a meaning, an emotion, or a rhythmic experience at a time-instant in the physical performance.

9. The electronic device according to claim 1, wherein the hand gesture attribute represents a root mudra of a plurality of root mudras of the body movement discipline.

10. The electronic device according to claim 1, wherein the circuitry is further configured to:

generate metadata for the image frame based on the plurality of performance attributes;

generate a first vector search query based on application of a contrastively trained neural network on the generated metadata; and input the first vector search query to the performance database.

11. The electronic device according to claim 10, wherein the performance database includes a plurality of assets, each of which includes:

embedding information that encodes the registered pose of the body movement discipline, metadata associated with each of the registered pose and a source image frame that depicts the registered pose, and tags associated with the metadata.

12. The electronic device according to claim 11, wherein the circuitry is further configured to generate a set of non-fungible tokens (NFTs) for each of plurality of assets stored in the performance database.

13. The electronic device according to claim 11, wherein the registered pose represents a mudra of a plurality of mudras of the body movement discipline and is a key dance step made up of a root mudra associated with the hand gesture attribute, a posture associated with the body, and an emotion associated with the emotion attribute.

14. The electronic device according to claim 11, wherein the circuitry is further configured to:

compute a vector similarity score between the input first vector search query and each asset of the plurality of assets of the performance database; and generate the first search result based on the vector similarity score that is below a threshold similarity score, wherein the first search result indicates that the localized instance represents the unregistered pose of the body movement discipline; and update, based on the metadata for the image frame, the performance database to include the localized instance as a new registered pose of the body movement discipline.

15. The electronic device according to claim 11, wherein the circuitry is further configured to:

receive, from a user device, a user input associated with the body movement discipline, wherein the user input includes at least one of a natural language query or an image-based query;

generate a second vector search query based on application of the contrastively trained neural network on the user input;

compute a similarity score between the second vector search query and each asset of the plurality of assets;

generate a second search result that includes a top-k assets of the plurality of assets for which the computed similarity score is above a threshold score; and control the user device to display a response based on the second search result, wherein the response includes the source image frame that depicts the registered pose in at least one of the top-k assets.

16. A method, comprising:

in an electronic device:

receiving a sequence of input images that depicts a physical performance associated with a body movement discipline;

extracting a localized instance of a performer associated with the physical performance from an image frame of the sequence of image frames;

determining a plurality of performance attributes associated with the performer based on application of an attribute recognition network on the localized instance, wherein the plurality of performance attributes comprises:

an emotion attribute that includes positional information associated with a set of facial features of the performer, a posture attribute associated with a body of the performer, and a hand gesture attribute associated with each hand of the performer; and searching a performance database based on the plurality of performance attributes to generate a first search result, wherein the first search result specifies that the localized instance represents an unregistered pose or a registered pose of the body movement discipline.

17. The method according to claim 16, wherein the body movement discipline corresponds to an Indian dance form, a martial art, or yoga.

18. The method according to claim 16, wherein the electronic device is further configured to apply a segregation and localization (SL) network on the image frame to generate localization information associated with the performer, wherein the localized instance of the performer is extracted based on the localization information.

19. The method according to claim 16, wherein the hand gesture attribute represents a root mudra of a plurality of root mudras of the body movement discipline.

20. A non-transitory computer-readable medium having stored thereon, computer-executable instructions that when executed by a first electronic device, causes the first electronic device to execute operations, the operations comprising:

receiving a sequence of input images that depicts a physical performance associated with a body movement discipline;

extracting a localized instance of a performer associated with the physical performance from an image frame of the sequence of image frames;

determining a plurality of performance attributes associated with the performer based on application of an attribute recognition network on the localized instance, wherein the plurality of performance attributes comprises:

an emotion attribute that includes positional information associated with a set of facial features of the performer, a posture attribute associated with a body of the performer, and a hand gesture attribute associated with each hand of the performer; and searching a performance database based on the plurality of performance attributes to generate a first search result, wherein the first search result specifies that the localized instance represents an unregistered pose or a registered pose of the body movement discipline.

* * * * *